(12) United States Patent
Lutnick et al.

(10) Patent No.: US 12,282,884 B2
(45) Date of Patent: *Apr. 22, 2025

(54) EXAMPLES OF DELIVERY AND/OR REFERRAL SERVICES

(71) Applicant: CFPH, LLC, New York, NY (US)

(72) Inventors: Howard W. Lutnick, New York, NY (US); Jed Kleckner, New York, NY (US); Colin Sims, New York, NY (US); Jason White, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/230,250

(22) Filed: Aug. 4, 2023

(65) Prior Publication Data

US 2023/0377082 A1 Nov. 23, 2023

Related U.S. Application Data

(63) Continuation of application No. 17/333,985, filed on May 28, 2021, now Pat. No. 11,769,220, which is a continuation of application No. 16/454,271, filed on Jun. 27, 2019, now Pat. No. 11,023,989, which is a continuation of application No. 14/540,777, filed on Nov. 13, 2014, now Pat. No. 10,373,281.

(60) Provisional application No. 61/904,841, filed on Nov. 15, 2013.

(51) Int. Cl.
| | | |
|---|---|---|
| *G06Q 10/08* | (2024.01) | |
| *G06Q 20/20* | (2012.01) | |
| *G06Q 30/04* | (2012.01) | |
| *G06Q 30/0601* | (2023.01) | |
| *G06Q 30/08* | (2012.01) | |

(52) U.S. Cl.
CPC ........ *G06Q 10/08* (2013.01); *G06Q 20/202* (2013.01); *G06Q 30/04* (2013.01); *G06Q 30/0635* (2013.01); *G06Q 30/08* (2013.01)

(58) Field of Classification Search
CPC ...... G06Q 10/08; G06Q 20/202; G06Q 30/04; G06Q 30/0635; G06Q 30/08
USPC .......................................................... 705/21
See application file for complete search history.

(56) References Cited

U.S. PATENT DOCUMENTS

| | | | | |
|---|---|---|---|---|
| 6,999,941 B1* | 2/2006 | Agarwal | ............... | G06Q 30/06 705/26.2 |
| 2003/0154135 A1* | 8/2003 | Covington | ............. | G06Q 30/00 705/26.8 |
| 2010/0268620 A1* | 10/2010 | Angert | .................. | G06Q 30/08 705/26.1 |

\* cited by examiner

*Primary Examiner* — Garcia Ade

(57) ABSTRACT

Various systems and methods that may relate to referral and/or delivery services are described. Some embodiments may include billing merchants for delivery services in a consolidated fashion, some embodiments may include interactions with point of sale systems.

20 Claims, 9 Drawing Sheets

```
┌─────────────────────────────────────────────────────────────────┐
│ opening an account for a merchant with a delivery/referral service │
└─────────────────────────────────────────────────────────────────┘
                                │
┌─────────────────────────────────────────────────────────────────┐
│   receiving from the merchant an indication of a plurality of orders │
│     for which respective customers have requested delivery       │
└─────────────────────────────────────────────────────────────────┘
                                │
        ┌────────────────────────────────────────────┐
        │      facilitating respective delivery of such      │
        │     a plurality of orders to respective customers  │
        └────────────────────────────────────────────┘
                                │
┌─────────────────────────────────────────────────────────────────┐
│  paying respective delivery agents for performing the respective │
│      deliveries of the orders to the respective customers        │
└─────────────────────────────────────────────────────────────────┘
                                │
              ┌──────────────────────────────────┐
              │   recording a respective delivery cost   │
              │      for each of the plurality of orders │
              └──────────────────────────────────┘
                                │
┌─────────────────────────────────────────────────────────────────┐
│  determining a consolidated bill for a merchant for the          │
│   respective deliveries of the plurality of orders to the        │
│   respective customers based on the recorded costs               │
└─────────────────────────────────────────────────────────────────┘
```

FIG. 8

EXAMPLES OF DELIVERY AND/OR REFERRAL SERVICES

CROSS-REFERENCE TO RELATED APPLICATIONS

This patent application is a continuation of U.S. patent application Ser. No. 17/333,985 filed May 28, 2021, which is a continuation of U.S. patent application Ser. No. 16/454,271 filed Jun. 27, 2019 (now U.S. Pat. No. 11,023,989 issued Jun. 1, 2021), which is a continuation of U.S. patent application Ser. No. 14/540,777 filed Nov. 13, 2014 (now U.S. Pat. No. 10,373,281 issued Aug. 5, 2019), which claims the benefit of U.S. Provisional Application No 61/904,841 filed Nov. 15, 2013, each of which is incorporated by reference herein in its entirety.

FIELD

Some embodiments may relate to electronic commerce.

BACKGROUND

Communication networks allow customers to communicate order information to merchants. Delivery of goods may be made to customers. Mobile devices (e.g., smartphones, tablets, laptops, cellphones, and so on) are becoming increasingly ubiquitous and sophisticated.

SUMMARY

The following should be interpreted as example embodiments and not as claims.

A. An apparatus comprising: a computing device; and a non-transitory medium having stored thereon a plurality of instruction that when executed by the computing device cause the apparatus to: open an account for a merchant with a delivery/referral service; receive from the merchant an indication of a plurality of orders for which respective customers have requested delivery; facilitate respective delivery of such a plurality of orders to respective customers; pay respective delivery agents for performing the respective deliveries of the orders to the respective customers; record a respective delivery cost for each of the plurality of orders; and determine a consolidated bill for a merchant for the respective deliveries of the plurality of orders to the respective customers based on the recorded costs.

B. An apparatus comprising: a computing device; and a non-transitory medium having stored thereon a plurality of instruction that when executed by the computing device cause the apparatus to: receive information regarding inventories of a plurality of merchant from a plurality of point of sale systems; receive an indication of a delivery order that a customer places with a merchant of the plurality of merchants; determine one or more sources of items for a high speed delivery of the delivery order to the customer based on the reported inventories of the plurality of merchants; determine one or more delivery agents for making the high speed delivery from the one or more sources to the customer; determine a cost for the high speed delivery of the delivery order; in response to determining the one or more sources and the cost for the high speed delivery of the delivery order, transmit information identifying the cost; receive an indication that the customer desires the high speed delivery of the delivery order; in response to receiving the indication that the customer desires the high speed delivery, communicate to a point of sale system of at least one of the one or more sources that at least one item is unavailable; and in response to receiving the indication that the customer desires the high speed delivery, facilitate the high speed delivery of the items from the one or more sources using the one or more delivery agents.

FIGURES

Figure 4A:
Figure 4B:
Figure 4C:
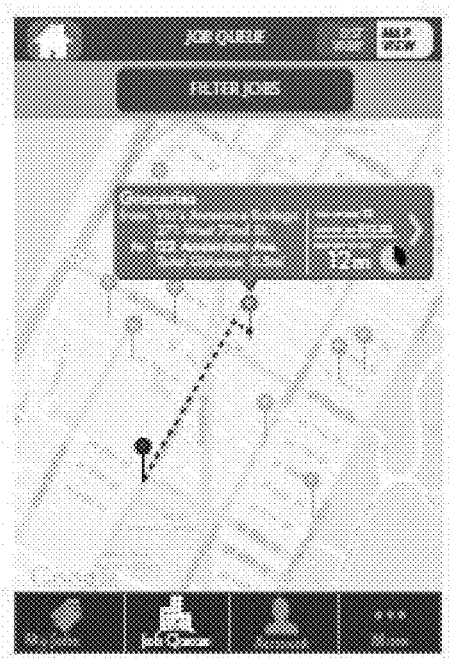

FIGS. 4A, 4B, and 4C each illustrate some example interfaces that may be used in some embodiments.

FIGS. 5A, 5B, 5C, and 5D each illustrate some example interfaces that may be used in some embodiments.

Figure 6A:
Figure 6B:
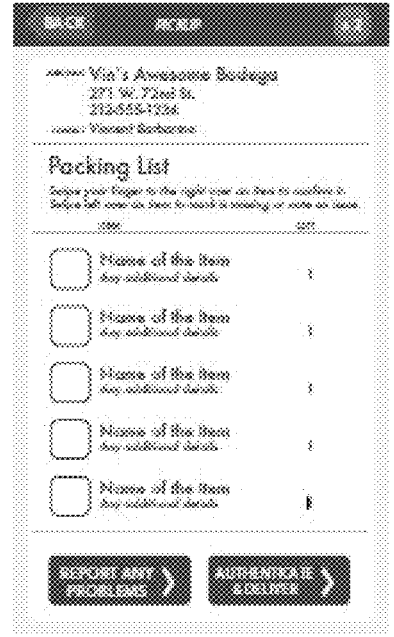
Figure 6C:

FIGS. 6A, 6B, and 6C each illustrate some example interfaces that may be used in some embodiments.

Figure 7:
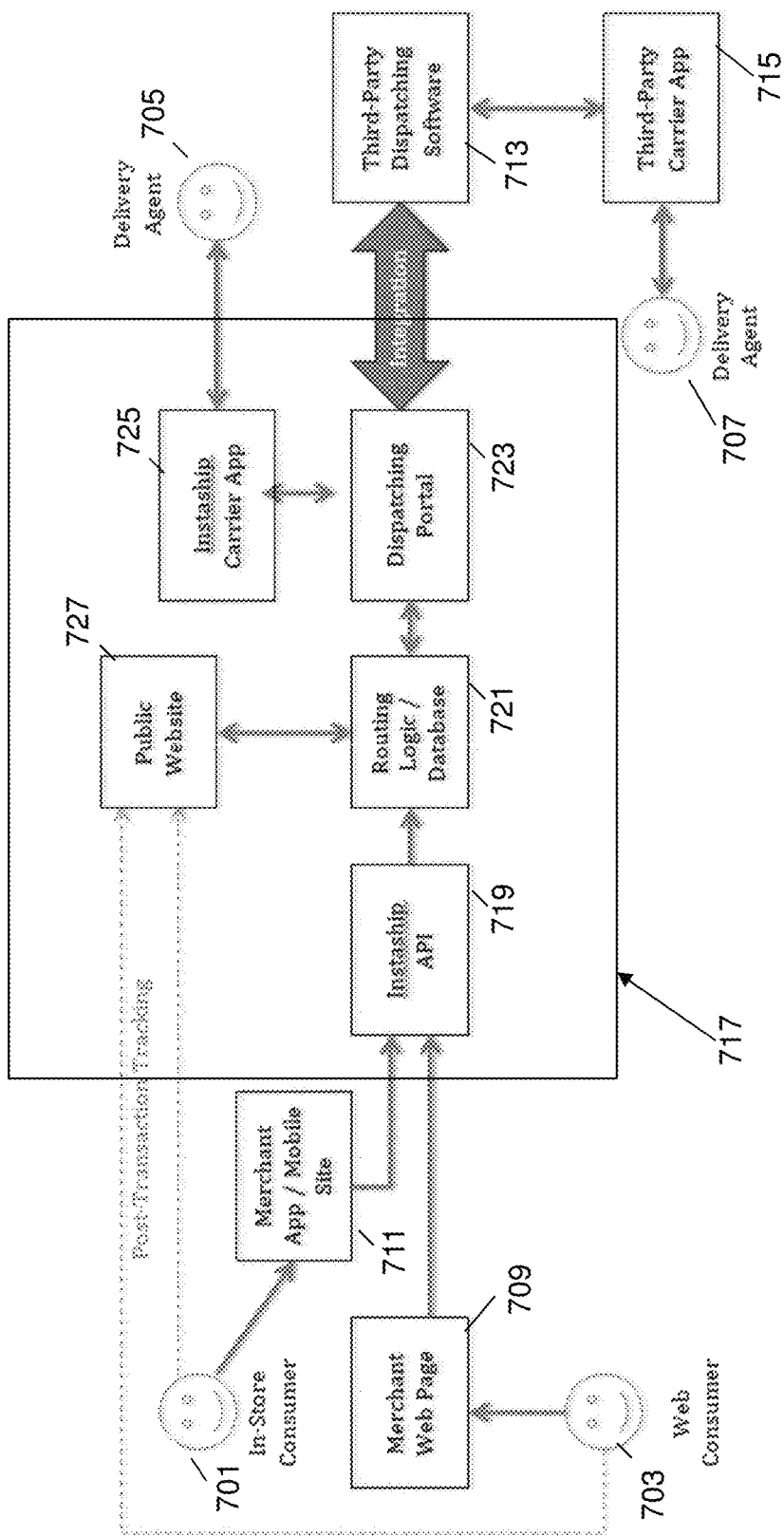

FIG. 7 illustrates an example system that may be used in some embodiments.

FIG. 8 illustrates an example method that may be used in some embodiments.

Figure 9:
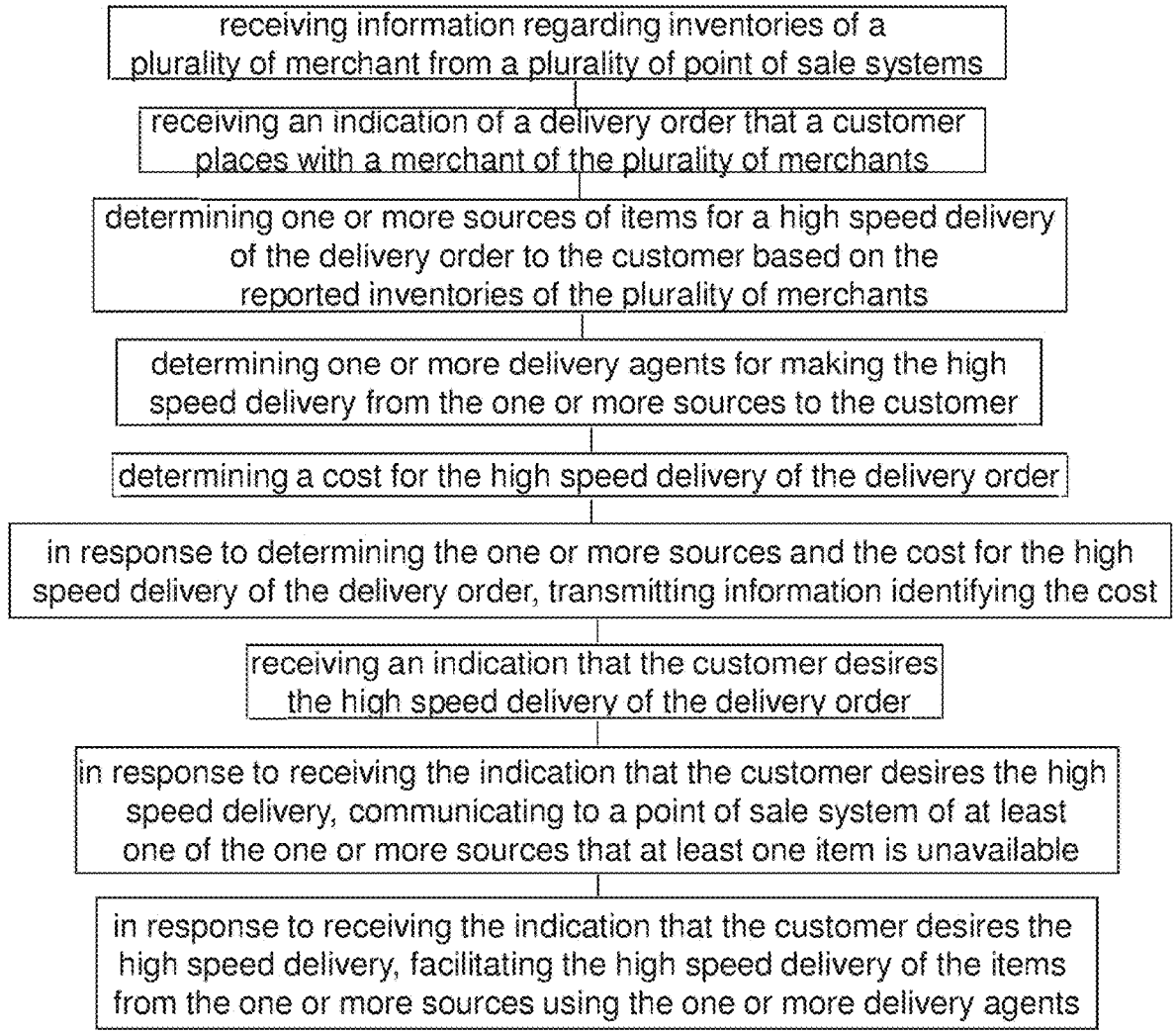

FIG. 9 illustrates an example method that may be used in some embodiments,

DETAILED DESCRIPTION

U.S. patent publication 2008/0161944 entitled Method and Apparatus for Group Filtered Reports, U.S. patent publication 2008/0195538 entitled Payment During Trial Period of Referral Service, U.S. patent publication 2009/0083135 entitled Products and Processes for Revenue Sharing, U.S. patent publication 2009/0083324 entitled Method and Apparatus for Menu Generation, and U.S. patent application Ser. No. 13/023,740 entitled Multi-system Distributed Processing of Group Goals are all hereby incorporated herein by reference. Any embodiments described in one or more of such patent applications and/or herein may be used in any combination with one or more embodiments described herein in any combination.

It is recognized that one or more participants in a customer, merchant, and/or delivery person relationship may utilize a computing device with enhanced functionality. For example, mobile devices (e.g., smartphones) may include cameras, gyroscopes, gps devices, touch screens, accelerometers, internet connections, and so on. Such devices may include processors and/or memory capable of providing services that might not have been possible without the use of these devices. Other example devices and functionality may be used in various embodiments.

Communication of information to or from one or more computing devices may take any desired form. For example, order information may be transmitted to a merchant, confirmation information may be transmitted from a merchant, time estimate information may be transmitted from a merchant, time request information may be transmitted to a merchant, payment information may be transmitted to a merchant, special request information may be transmitted to the merchant, credit authorization may be transmitted to the merchant, reservation information may be transmitted to/from a merchant, delivery information may be transmitted to or from a merchant, payment information may be transmitted, and so on. Such information may be transmitted to and/or from a communication device (e.g., a fax machine, a telephone, an email client, a SMS client, etc.) associated with the merchant and/or a delivery person. A merchant, for example, may include a restaurant, a grocery store, any merchant that provides any goods and/or services.

Some embodiments may include methods and apparatus related to a referral service and/or a delivery service. Some embodiments of such a service may receive an indication of an order for a merchant from a user of the service and may forward the indication of the order to the merchant. Some embodiments may facilitate delivery of items fulfilling the order from the merchant to the user.

It should be recognized that the term facilitates, and derivations thereof are used herein in an extremely broad sense. Such terms may be used to include any action that may directly, and/or indirectly bring about and/or help to bring about a thing. For example facilitating transmission may include allowing a transmission, transmitting, transmitting directly, transmitting indirectly, any action that may aid in transmission, and so on.

In some embodiments, orders for one or more merchants may be collected by an order collector and/or referral/ delivery service such as a website operated at www.delivery.com. Such a website may provide options for a user to select one or more items from one or more merchants to order and/or have delivered. Such a website may be operated at one or more web servers and or other servers. Such a web site may be reached over the Internet using a web browser, over another network, and so on. Other methods of submitting orders may be used, such as telephone, fax, email, proprietary software, and so on.

In some embodiments, payment for one or more orders may be made through an order collector, to a merchant, to a delivery agent, and so on. Payments may originate from various sources, such as banks, individuals, payment processing services and/or money transferors. Payments may be distributed among merchants, referral service providers, delivery agents, delivery service providers, payment processing services, and any other desired entity.

In some embodiments, an indication of order information, delivery information, merchant information, user information, payment information may be transmitted and/or received from and/or by one or more computing devices such as a mobile device.

An indication of a payment may include, for example, one or more of an indication that a payment has been made, an indication that a payment has been authorized, an indication of approval of a payment, an indication of an amount of a payment, and/or an indication of a promise to make a payment in the future. In some implementations, an indication of a payment may include an indication that a payment has been made to a desired money account. In some implementations, the indication may be received from an entity making or processing a payment to the desired money account (e.g., a bank, a credit card company, a money transferor, a payment processing service). In some implementations, the indication may be received from an entity receiving the money (e.g., a bank, a credit card company, a money transferor, a payment processing service). In some implementations, the indication may be received after the money is authorized to be transferred into the desired account but before the money is transferred/received. In some implementations, the indication may be received after the money is transferred into/received at the desired account.

Some embodiments may include collection of a payment. For example, in some embodiments, a delivery agent may collect a promised payment upon delivery and/or pickup, a credit card may be charged an authorized amount, and so on. In some embodiments, a payment agreed upon initially may be changed later, such as to add a tip, adjust for undelivered items, refund for a coupon, and so on. Some embodiments may further include distributing the collected payment among one or more entities, such as the delivery agent, a merchant, a referral and/or delivery service, a payment processing service, and so on.

Figure 1:
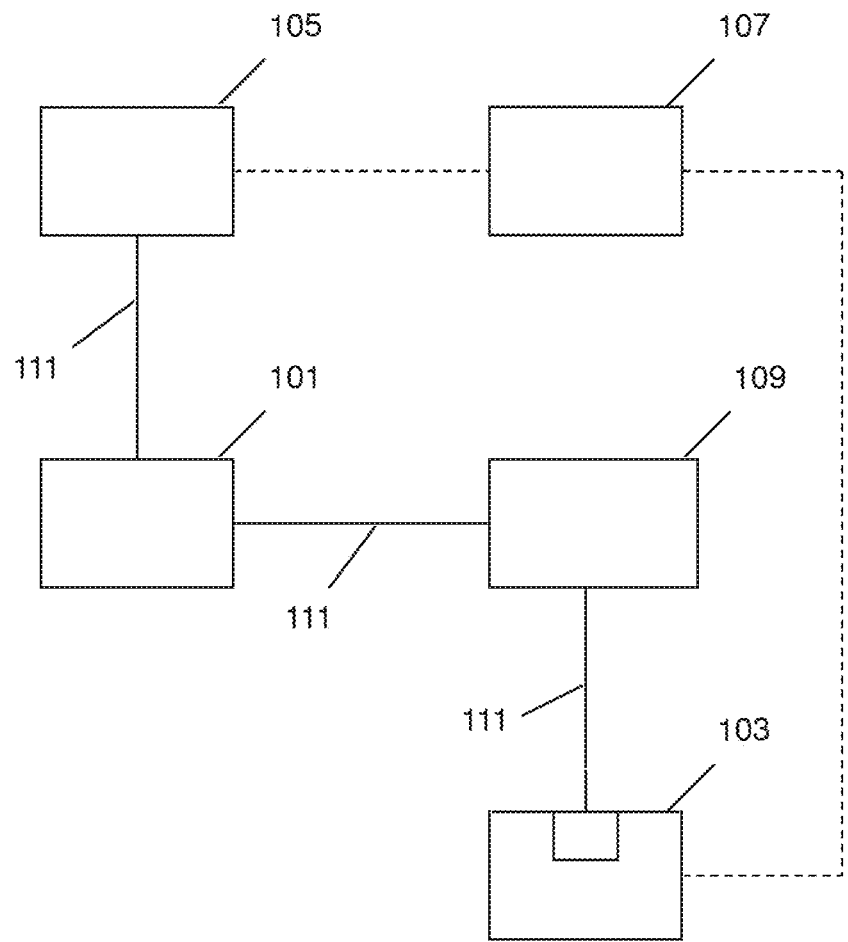
FIG. 1 depicts a system according to at least one embodiment of the systems disclosed herein.

FIG. 1 illustrates an example diagram of a service implemented in some embodiments. System 101 may include a computer system as described above. System 101 may be configured to provide a referral and/or delivery service. System 101 may include a web server configured to provide a user interface to one or more users to place orders, to one or more merchants to establish menus and merchant information, to one or more administrators, and so on. System 101 may include any number of servers configured to provide any desired processing regarding order information, payment information, delivery information, review information, and so on. System 101 may include a communication interface configured to communicate information to one or more remote destinations, such as to a merchant, to a payment processing service, to a delivery agent, and so on. Such a communication interface may include a network interface, a SIM card for cellular access, a telephone line, and so on.

Some embodiments may include a merchant 103. In some embodiments, a plurality of merchants may be provided referral and/or delivery service by system 101. Merchant 103 may register with the referral and/or delivery service, such as providing menu information, hours of operation, delivery area information, and so on to the service (e.g., through a website and/or other interface, over the phone, through mail, etc.). Merchant 103 may include a restaurant in some implementations. Such information may include one or more food items offered by a menu of the restaurant.

Some embodiments may include a user 105. User 105 may access a system 101, such as a website to place an order for one or more merchants 103 that use the services offered by system 101. The system 101 may provide information about the items offered by the merchants such as food items offered through a menu of a restaurant. A user may place an order for one or more food items offered by one or more restaurants and/or other items offered by other merchants. Such an order may include a purchase of an item and/or service, a delivery order, a pickup order, and so on. Such an order may include any number of details regarding the order such as allergy information, delivery time, pickup time, directions, delivery agent, and so on. A user may submit payment information for such an order through such a service and/or may later provide payment information to a merchant, to a delivery agent, and so on. Such an interaction may take place through software, through a web browser, on a phone, over fax, via email, and so on.

Some embodiments may include a delivery agent 107. Such a delivery agent may be part of the merchant and/or may be a third party. Such a delivery agent may act to deliver items from the merchant to the user as indicated by a dashed line in FIG. 1. In one implementation, delivery agent 107 may include a person who travels from merchant 103 to user 105. In some implementations, delivery agent 107 may deliver to another location rather than to the user if the user 105 desires such delivery (e.g., if the order indicates such delivery). In some implementations, delivery agent 107 may include a person traveling by an automobile, bicycle, or any other means. Some embodiments may include a communication interface with the delivery agent. Such an interface may allow the delivery agent to communicate with the merchant, the user, the system, the payment processing center, and so on. Such a communication interface may include a telephone line (e.g., a cell phone), a fax machine, a computer and/or another means of electronic communication. For example, in some implementations a cellular telephone may communicate information regarding the delivery to the delivery agent 107, e.g., through a telephone call, text message, web interface, API, smart phone app, etc. In some implementations, an electronic message such as an SMS, MMS, https message, a push message, or email message may communicate the information, for example to a mobile device carried by delivery agent 107 or to a central dispatcher that then relays the information to delivery agent 107. Such information may be sent to the delivery agent by another source, such as system 101, merchant 103, user 105, a payment processing service, and so on as desired in an implementation, for example, based on who desired to arrange such a delivery if such a delivery is even desired at all.

Some embodiments may include a payment processing service 109. In some embodiments, payment processing service may be configured to receive information about a credit and/or debit card transaction and facilitate a charge being placed with the credit and/or debit card. The payment processing service may transmit authorization information identifying that the payment has been processed. Payment processing service may include a service such as VeriFone. Such a service being used to provide payment processing to a merchant is well known. For example, a merchant may swipe a credit card into a payment processing device, which may transmit information about the credit card to the payment processing service. The payment processing service may verify the credit card and authorize a charge. In response the payment processing service may send authorization information to the payment processing device which may then print a receipt that a customer signs. It should be recognized that this is one non-limiting example of a use of a payment processing service to process payments. Further examples of a payment processing service, payment processing device, and/or operation not involving processing payments are described elsewhere herein.

Some embodiments may include one or more communication networks 111. Such networks may include one or more combination of networks as desired. For example, such networks may include a telephone line, cable lines, cellular links, wi-fi, DSL lines, near field communication, optical communication, Bluetooth, the Internet and/or one or more local area networks. Each communication link may be separate or may be shared. For example, a network used by a user to access the system may include a local network and/or the Internet. A network used to communicate between a payment processing service and a merchant may include a dedicated link, a telephone line, and/or the Internet. A network used to communicate between a payment processing service and the system may include a dedicated link, a telephone line, and/or the Internet. Various information desired to perform any desired method or transaction may be communicated in any desired format through such networks.

It should be recognized that the example of FIG. 1 is given as a non-limiting example of some possible components of a delivery and/or referral service. For example, some embodiments may not include separate delivery services and merchants, some embodiments may include a single merchant, delivery agent, and referral service as one entity, some embodiments may include any number of additional or intermediary entities, such as delivery auction services, delivery analytic services, delivery rating services, and so on. Any described functionality and/or components may be used together in any combination. It should be recognized that any arrangement or any number or types of components may be used in various embodiments in any combination as desired.

Some embodiments may include various methods and/or systems that may facilitate delivery and/or providing/choosing any service provider. Some examples of choosing a service provider are given below in terms of a delivery agent, but it should be recognized that similar and/or alternative methods may be used for choosing any desired service provider. In some embodiments, facilitating delivery may include determining a delivery agent. Such a delivery agent may be a delivery agent of a merchant, a delivery agent of a user, a delivery agent of system 101, a third party delivery agent, and so on. A delivery agent may include an individual that uses a service to provide delivery services, a part of a broader delivery service such as a courier service, a cab service, and so on, a part of an entity that may have excess delivery capacity (e.g., a moving company that has unused moving vans, a cab company that has unused cabs, etc.). In some embodiments, a service that allows users to act as delivery agents may be used to solve such unused capacity or open leg capacity problems by giving jobs that can use the unused capacity. In some embodiments, determining a delivery agent may include determining a delivery agent through an auction. In some embodiments, determining a delivery agent may include determining a delivery agent based on a price quote for the delivery by each of a plurality of delivery agents. In some embodiments, determining a delivery agent may include determining a delivery agent based on a time of delivery quote for each of a plurality of delivery agents. Some embodiments may use such a method to determine a most effective delivery agent for one or more orders. Some embodiments may include delivery agents bidding on an opportunity to make one or more deliveries. Some embodiments may include determining a delivery agent based on a rating of the delivery agent. Some embodiments may include determining a delivery agent based on a qualification of the delivery agent.

In some embodiments in which a delivery agent is part of some entity that provides some other services (e.g., cab services, courier services, mobbing services, etc.), some central dispatch agent may arrange for some of the deliveries to be performed. For example, some embodiments may include bidding, selecting jobs, entering information about jobs, and so on. Some or all of such functionality may be performed for an entity by a centralized dispatch agent rather than by individual delivery agents. For example, a cab dispatch agent may enter bids and assign jobs to cabs that work for the cab company. Such a dispatch agent may take into account locations of cabs, capacity of the company, expected demand, and so on to assign jobs to cabs and place bids on jobs.

In some embodiments, a service that provides referrals of orders to one or more merchants, such as some embodiments that may be described herein, may charge a fee to a merchant for such referrals. Such a fee may include a flat dollar amount, a percentage, a fee based on a service level, a fee based on a number of orders referred, and so on. For example, in some embodiments, a merchant may pay a base fee for a high level of service that includes an unlimited number of orders free of charge after the base fee is paid. In some embodiments, a merchant may pay no base fee, but may be charged a higher amount per order referred. In some embodiments, a merchant may pay, for example, about 10% of a purchase price associated with an order to a referral service and/or delivery service that refers the order to the merchant and/or provides delivery service for the order.

In some embodiments, a merchant, referral service, delivery service, and/or one or more service providers may be separate entities acting to provide a delivery and/or other service to a customer. Some embodiments may include allocating a payment for an order among the service providers. In some embodiments, each such service provider may agree to an allocation before performing a service (e.g., through a bidding process, through a contractual agreement, and so on). In some embodiments, a merchant, a referral service provider, and/or any other entity may receive the payment and provide a portion to each other service provider according to the allocation. In some embodiments, the payment to the service providers may be taken from a payment to the merchant for the purchase price, from a portion due a referral provider (e.g., 10% cut), as a service fee charged to a customer, and so on.

Mobile Merchant Examples

Some embodiments may include interactions involving a mobile device of a merchant and/or the mobile device itself. For example, such a mobile device may include a smartphone.

In some embodiments, a mobile device may execute a merchant facing application (e.g., an android application, an iOS application, a windows phone 7 application, and so on). Such an application may interface with a system such as 101 above (e.g., through the internet, using one or more communication messages such as an html message). In some embodiments, such a merchant facing application may allow a merchant to access incoming order information, historic order information, and so on. In some embodiments, such an application may allow a user to view new orders, confirm, modify, or reject the orders, enter information about the orders, and so on.

In some embodiments, a service may receive an order from a user (e.g., through submission via a website, a mobile app, a telephone call, and so on). The order may identify one or more items to be ordered (e.g., food items, goods such as televisions, and so on). The order may identify a location for delivery, a time for pickup, a time for delivery, a request (e.g., allergy related, ingredient addition or subtraction, packaging preference, and so on).

In some embodiments, a service may push information about the order to a mobile application of a merchant. For example, in response to receiving an order, the service may transmit information to a mobile application. The information may identify one or more characteristics of the order (e.g., the items to be ordered, requests, etc.).

In some embodiments, a mobile application may pull information about the order to a mobile application of a merchant. For example, a mobile application on a merchant's mobile device may periodically poll a service requesting information about new orders. If a new order is available, the service may transmit the information to the mobile application. If no new order is available, the mobile application may be identified accordingly, or no response may be sent.

In some embodiments, incoming orders may be inserted into a database of a service (e.g., associated with a merchant, of all orders, etc.). In some embodiments, a mobile application may obtain information from the database (e.g., through a push or pull functionality, through an API). In some embodiments, information regarding orders may be transmitted as XML.

In some embodiments, multiple mobile devices may be associated with a single merchant. A service may transmit information to any of the devices that poll the service, and/or push the information to any registered device of the merchant. In some embodiments, one or more devices may be registered with a service as being associated with a merchant (e.g., logging into a mobile application with a username/password associated with the merchant in a database, choosing the merchant through a user interface, communicating the user account should be associated with the merchant, and so on).

In some embodiments, one or more mobile applications may be established as primary or current responsible devices, so that when a new order is received, that device is notified (e.g., pushed to that device). For example, a merchant may establish that at certain times or certain days, a particular device is responsible for orders from the service (e.g., a person working at those times or days, through an interface with the service). For example, each manager of a restaurant may use an interface of a mobile application to select hours and/or days that they will be responsible for receiving orders. When an order for the merchant arrives, the service may determine which mobile device is responsible based on that entered information, and in response, push the order information to that mobile device. Such limitation of receiving order may be imposed in a pull version as well such that only devices that are registered to receive information may pull it at the appropriate times. In some embodiments, any mobile device that is logged into the mobile application may receive order information (push and/or pull).

In some embodiments, a service may receive location information about one or more mobile devices associated with a merchant. Using the location information, the service may determine which mobile device to send order information to. For examples, a service may send (e.g., push and/or pull) order information to one or more (e.g., each) mobile device located at a merchant location when orders are received. Accordingly, the merchant's employees that are most likely to be working and responsible for the orders may receive the information and those that are not likely to be working and/or responsible for the orders may not receive the orders. In some embodiments, based on received location information, a reminder may be sent to a mobile device to log into a mobile application (e.g., if an employee associated with a merchant enters an area associated with the merchant, a SMS or email may be sent to the employee reminding the employee to log into the mobile application to receive orders). Such a reminder may be sent in response to a user entering the location, after some amount of time, and so on.

In some embodiments, if no device is pulling information or logged in to receive pushed information at a time when a merchant is registered as receiving such information, a service may contact one or more merchant through an alternative means to transmit order information or remind the merchant to use the mobile application (e.g., call an owner, call a manager, call a main line, send an email, etc.). In some embodiments, if no mobile application is available to receive order information (e.g., no one is logged into a service through a mobile application, no mobile device of the merchant is turned on or running the application, etc.), a service may determine that the merchant is not available for incoming orders (e.g., is closed, is overbooked, etc.). In response, a service may adjust a user interface presented to potential customers to identify that the merchant is not currently accepting orders (e.g., identify that a restaurant is closed at the moment). In some embodiments, a merchant may use a mobile application to turn on and/or off delivery from the merchant on demand by identifying when it is accepting and when it is not accepting orders through a service. In response to receiving information the service may adjust user interfaces presented to potential customers for making orders.

Through a merchant facing application, a merchant may confirm an order, reject an order, alter an order, adjust one or more parameters of an order, and so on. For example, a merchant may receive information about an order and in response, press one or more buttons on an interface. For example, a button may include a confirm button that if pressed may result in a confirmation message being sent to a service. As another example, a button may include a reject button that if pressed may result in a rejection message being sent to a service. Another control may include a adjust control that may allow a merchant to adjust (e.g., propose an adjustment) one or more characteristics of an order (e.g., a merchant may adjust a delivery time, may adjust a pickup time, may adjust an ingredient if they do not have that ingredient, refuse a coupon, adjust a price, and so on).

In some embodiments, a service may receive a reply to an order from a merchant and may take one or more appropriate actions in response. For example, in response to a confirmation, the service may identify to a customer that the order is accepted, determine delivery estimates, arrange for delivery, charge an account, and so on. As another example, in response to a rejection, the service may identify to a customer that the order was rejected, propose alternative orders, propose alternative merchants, return money to an account, and so on. As yet another example, in response to an order adjustment, a service may notify a customer of the adjustment, verify that the adjustment will work for the customer, begin a negotiation between a merchant and customer to determine parameters of the order, act as if the order is confirmed with the adjustment, and so on.

In some embodiments, if no response is received from a merchant in some time period, a merchant may be assumed to accept an order. In some embodiments, if no response is received from a merchant in some time period, a merchant may be assumed to accept an order. In some embodiments, if no response is received from a merchant in some time period, some further actions for confirming the order may be taken. For example, a backup mobile device may be connected (e.g., if an employee that is registered as responsible for a time period does not confirm in five minutes, a manager or backup employee may be contacted). As another example, an alternative contact mechanism may be used such as an email, a telephone call, a fax, and so on. In some embodiments, a merchant may identify the time period to a service. In some embodiments, a service may use a time period it desires. Some example time periods may include 30 seconds, 1 minute, 5 minutes, 10 minutes, 30 minutes, 1 hour, 5 hours, 12 hours, 24 hours, 1 week, 1 month, 1 year, and so on. In some embodiments, a time period may be based on a size and/or complexity of an order (e.g., an order for a lunch from a restaurant may have a small time period, an order for a grocery delivery to stock a household may have a longer time period, and an order for a set of goods to stock a business may have an even longer time period). In some embodiments, such time periods may relate to a complexity of confirming stock of goods ordered.

In some embodiments, a location of a merchant device may be used by a service to determine a delivery zone associated with the merchant. For example, a food truck or other merchant that may have a mobile store front may desire to provide delivery services for some distance around the merchant location. A mobile device may move along with the location (e.g., as an employee moves the location). In some embodiments, a mobile application may report gps coordinates to a service. In some embodiments, a third party may report device locations to a service (e.g., based on gps location, based on cell tower triangulation, based on Wi-Fi networks accessed, and so on).

In some embodiments, based on a location of a merchant (e.g., based on received gps locations), a service may adjust a user interface shown to a customer and/or a delivery area of a merchant. For example, a service may adjust a delivery area to include a 5 block radius, a radius having an expected 10 minute travel time, a 2 mile radius, and so on as desired (e.g., as set by a merchant, a delivery provider, a service, and so on). Accordingly, based on merchant location (e.g., mobile device location), a delivery area may be dynamically determined for a merchant.

Users that access a website to see merchants that deliver to a location may be shown information identifying the adjusted delivery area. In some embodiments, a user may be sent a notice if a favorite or desired merchant moves into a delivery range of the user. Some examples of such functionality are discussed herein with respect to user apparitions, but it should be recognized that such functionality may not be limited to user mobility.

In some embodiments, a merchant may use a camera or other input functionality of a mobile device to update information of a service. For example, a merchant (e.g., a restaurant) may include a daily special. The merchant may use a mobile application to input information identifying the daily special (e.g., name, price, ingredients, description, options, etc.). In some embodiments, a mobile application may read input form a camera of a mobile device to allow a merchant to take a picture of the daily special. A user accessing a menu through a service may view the pictures taken using the mobile device. Accordingly, a merchant may utilize the camera functionality of a mobile device to maintain daily special information, update images of a store, update images of other items, and so on.

In some embodiments, a camera of a mobile device of a merchant may be used to obtain information, verify information, and so on. For example, a mobile application may be used to scan a coupon presented by a user and/or given to a delivery agent that then delivers it to the merchant. For example, a bar code of the coupon may be scanned using the camera of the mobile device. The mobile device may store information identifying used coupons, apply the coupon to an order to adjust a price, upload the coupon information to a service so that the service may store used coupons so that they are not used again, upload the coupon information to any desired storage service or reimbursement service (e.g., of a manufacturer for rebate obtaining), compare the coupon code to a list of acceptable coupons to verify its authenticity, and so on.

As another example of camera usage, a merchant may obtain pictures of customer identification (e.g., drivers licenses). Such identification may be required by some jurisdictions for delivery of certain types of goods. For example, if alcohol is being delivered, a state may require verification of an age of a customer. Accordingly, to verify such age, a merchant may take pictures of customer IDs (e.g., customers may be required to bring such IDs to a merchant to take such a picture before such delivery is allowed for subsequent delivery). In some embodiments, a service may store such information, a delivery provider may store such information, and so on. As another example, a merchant may be required to verify identification and/or run a background check of a customer for delivery of other types of goods (e.g., medications to customers and/or medical providers, chemicals to laboratories, and so on). Identification pictures may be used to maintain records that may be required by various jurisdictions or laws to provide ongoing delivery services to such customers. A camera of a mobile device may be used to capture such identification by a merchant. Such information may be obtained and/or stored by a merchant, a delivery agent, and/or a service in any manner and/or combination (e.g., at a cloud storage service by a service, on a SIM card of a merchant, on a SIM card of a delivery agent, and so on).

In some embodiments, a mobile device may allow a merchant to have direct contact with a customer. For example, a merchant may be provided with a telephone number of the customer through a mobile application (e.g., as part of order information). In some embodiments, the merchant may operate a control (e.g., click on a contact button) to initiate a call to the customer's telephone number. Through such contact, a merchant and customer may negotiate changes to an order, discuss pickup and/or delivery details, and so on.

In some embodiments, a mobile application of a merchant device may allow the merchant to update status information for an order. Such status information may be communicated to a customer and/or a delivery agent as desired. Such status information may identify to a delivery agent that merchandise is ready for pickup. Such status information may be viewed by a customer to help determine when an order may be delivered.

In some embodiments, a mobile application may interact with a mobile application of a mobile device of a customer and/or delivery agent mobile device. For example, a Bluetooth, Near Field Communication, optical (e.g., one device taking a picture of a code on another device screen), and/or other communication method may be used to communicate between such devices. For example, a merchant may tap a merchant device to a delivery agent device to identify a transfer of responsibility for an order from the merchant to the delivery agent. Based on such a transaction, a service may be notified, and status information may be adjusted for a customer to view. In some embodiments, such status updating may occur in response to location tracking of a delivery agent and/or merchant (e.g., if a delivery agent enters a merchant location and moves away a service may determine that an order has been picked up).

Mobile Store Setup

Some embodiments may facilitate a merchant setup by using one or more mobile devices by a merchant and/or other user. For example, a mobile device may include an image capture mechanism that may be used to scan a barcode. The barcode may be transmitted from a mobile device to a referral or delivery service. The service may compare the barcode to a stored set of barcodes to determine item information. The service may add the item corresponding to the barcode to a menu for the merchant. The merchant may set parameters for the item, such as price, through the mobile device as part of a merchant setup process. Such a process may be used to add new items, add all items, add some items, remove items, and so on when a merchant starts using a service, and/or when a merchant desires to adjust items offered for sale through a service.

Some embodiments may include storing information that associates barcodes with item information. Such information may be entered into a computer system of a service by an agent of the service. For example, in some embodiments, an employee and/or computer program may scan in a set of barcodes associated with a set of items. For each item, the agent may associate with that item (e.g., in a database that ties items to menu information), some menu information. The menu information may include a name, a description, a price, a layout, set of suboptions (e.g., mild, medium, in a bag, without utensils, large, small) that may be used to order the item, and/or any other information that may be used to add the item to one or more menus.

In some embodiments, such information may be received from a collector of barcode information, such as a website that stores information about barcodes. For example, a UPC database may be queried to access such barcode information. The information obtained from such a query may be stored in a database. Such information may be formatted to allow it to be added to a menu in the future. Such information may be augmented with information that allows it to be useful in a menu in the future (e.g., price, description, etc.). Such augmented information may be entered by an agent of a service.

It should be recognized that obtaining and/or storing such information may occur at any time in some embodiments. For example, such actions may occur before a menu is established and/or changed for a merchant to include the item. In such an example, a database of barcodes and associated menu information may be established. That database may be used to populate menu information for a merchant by assigning scanned items to the menu of the merchant by querying the database for menu information in response to barcode scans. In another example, such obtaining and/or storing may occur in response to such scanning of barcodes. For example, an agent or collector may be queried for information in response to a scan. Such information may be imported as needed rather than stored until needed. A first time a barcode is witnessed by a service, the barcode may then be imported into a barcode to information database or other data structure from such source and then may be used for subsequent barcode reads without need to query such source. In yet another example, such information may be obtained on demand when a menu is accessed. For example, data structure may store barcode information. When the menu is requested (e.g., a website with the menu is accessed on the internet), the menu may be populated by querying a source of barcode information (e.g., a collector or database).

In some embodiments, information associated with a barcode may include information for inclusion in a website through which users may order items from a merchant. For example, for a particular menu, such information may include where in the menu to place the item, a price for the item, a description of the item, and so on. Such information may be received along with the barcode from a merchant (e.g., a merchant may scan a barcode and enter a price for the item into a mobile device interface and transmit both pieces of information to a service). Such information may be entered by an agent or obtained from a third party (e.g., a barcode and price may be received form a merchant, a description for the item may be obtained from a UPC database, and an agent of the service may determine where to place the item in a menu structure). Accordingly, any information may be obtained from any source that allows the barcode to be used to create a menu for a merchant.

Some embodiments may include receiving an identification of a merchant. For example, before a merchant starts to scan barcodes of items to add to a menu, the merchant may login to a service to identify himself. Subsequent barcode scans may then be associated with that identified merchant.

Some embodiments may include receiving barcode information from a merchant. For example, such information may be scanned using a camera of a mobile device and transmitted to a service through a communication network (e.g., cell network, LAN). Such information may be received by a computer system of a service and processed as desired (e.g., associated with a menu, associated with information to be added to a menu). Such information may include a picture of a barcode, a sequence of numbers representing the barcode, and/or any information from which a barcode and/or item (e.g., a mobile device may determine the item and send a link such as a webpage link to the item instead of the barcode) may be determined.

Some embodiments may include receiving information to be associated with the barcode, item, and/or menu. For example, a merchant may enter price information, description information, and so on into a mobile device. As another example, description, price, and so on information may be obtained from a UPC collector and/or agent. As another example, a merchant and/or agent may enter information about how and/or where the information should be displayed in a menu (e.g., in a particular section, only during sometimes such as when alcohol sales are allowed, and so on). Such information may be associated with a barcode and/or menu.

Some embodiments may include in response to receiving a barcode and/or information to be associated with the barcode, item, and/or menu, the item may be added to the menu for ordering from the merchant. For example, received information describing the item may be added to a designated location in a menu and offered for an identified price. Accordingly, when customers request the menu in the future, the item will appear in response to the merchant scanning the barcode.

Some embodiments may include associating some of the same information with a plurality of menus. For example, a plurality of merchants may offer the same item for sale. Accordingly, the same description of the item (e.g., entered by an agent and/or obtained from a UPC collector) may be used for each menu.

Some embodiments may include receiving requests for the menu form customers. Some embodiments may include transmitting indications of the menu to the customers. Such indications may include the scanned item.

Some embodiments may include a remove item functionality that may use barcodes to identify the item. For example, a merchant may scan a barcode and transmit that barcode to a service to request the item be removed from a menu. In response to receiving that request, a service may remove the item from a menu of the merchant (e.g., disassociate a menu of the merchant with information about the item).

Merchant and Customer Interaction Examples

Some embodiments may include a mobile merchant and a mobile customer that may interact with one another. In some embodiments only one of such actors may be mobile, but descriptions are given in terms of both for the sake of a non-limiting example.

For example, some embodiments may include a customer transmitting an order in response to a relationship between a customer and merchant location. For example when a customer enters a particular area around a merchant (e.g., an ordering and/or delivery area), an order may be transmitted to the merchant for the customer. An ordering area may be a different (e.g., larger) area than a delivery area to account for a time to get to the merchant. Accordingly, a customer may enter an ordering area and then an order may be placed in response to entering the area. The order may indicate delivery or pickup. The merchant may receive the order and prepare for delivery or pickup accordingly.

Some embodiments may facilitate such functionality in a distributed fashion. For example, a mobile device may monitor its location and transmit the order to the merchant and/or service when an area near the merchant is reached. A customer may define the area, a merchant may define the area, and/or a service may define the area as desired. For example, a customer may identify to an application on a mobile device that when they reach 1 mile from a merchant that an order for a food item should be placed with that merchant for pickup. The mobile device may then monitor the customer location (e.g., set up a geofence and monitor if the geofence is entered, use GPS coordinates, use triangulation, etc.) and/or merchant location. In response to the area being entered, the order may be submitted to a delivery and/or referral service associated with the application. The service may then transmit the order to the merchant to facilitate pickup and/or delivery.

Some embodiments may facilitate such functionality in a centralized fashion. For example, a service may receive an order to be submitted to a merchant from a customer. The service may monitor a location of a merchant and a customer (e.g., receive GPS coordinates, etc.) and determine whether the customer is in an ordering area of a merchant based on such information. The service may submit an order to the merchant in response to determining that the customer is in such an area.

It should be recognized that any manner of distributed and/or centralized may be used and that such examples are given as non-limiting examples only. It should be recognized that in some embodiments, a merchant may be mobile and/or stationary and that a customer may be mobile and/or stationary in any combination.

It should be recognized that while examples are given in terms of difference between customer and merchant locations, that such examples are non-limiting. For example, any locations may be used in various embodiments in any combination. As one example, an order may be transmitted in response to a customer being a distance from home, reaching their work, and so on. Any location and/or distance of a customer from a location may be used as a triggering mechanism for order placement. Similarly any location and/or distance from a location of a merchant may be used as a trigger for order placement. For example, an order may be triggered when a merchant is 2 miles from a customer that is one mile away from their home. Any combination of merchant location, customer location and/or relationships between such locations and any other locations may be used in any combination in various embodiments.

Another example may include facilitating location determination of a customer and/or potential customers for a merchant and/or delivery agent. For example, some embodiments may include displaying an indication of a particular customer's location to a merchant. As another example, some embodiments may include displaying an indication of potential customers' locations to a merchant.

In a particular customer example, a merchant may have received an order from the particular customer. If, for example, the order is a devilry order, a merchant and/or delivery agent may be shown a location of the customer so that the merchant and/or delivery agent can deliver the order to the customer. A mobile device of a merchant and/or delivery agent may be controlled to show gps coordinates and/or another display of information that may be useful for finding the customer. For example, a radar display may show a customer location, a display may indicate a direction to turn, a display may indicate a distance to travel between a merchant and a customer, and so on.

In a potential customer example, a merchant may desire to see where potential customers are located, a number of potential customers in an area, and so on. Potential customers may include customers that have an app for a delivery and/or referral service used by the merchant installed, an app for the merchant installed, have placed an order with the merchant, are otherwise identified in some way as potential customers (e.g., twitter follower, social network, other likes, etc.).

In some embodiments, location information of such potential customers may be received by a service. For example, a service may receive GPS coordinates of each of the users with its app installed on their phone, addresses of users that have logged into the service on stationary computers to place orders, location information from other location sources (e.g., buy location information form Facebook and/or other mobile location based services).

In some embodiments, a determination of potential customers for a merchant may be made. Such a determination may be made in response to filtering criteria set by the merchant and/or by desired criteria set by a service (e.g., a service may use just mobile users and a merchant may want to see information about repeat customers only). Based on such criteria one or more potential customers may be determined.

In some embodiments, a merchant may be shown information identifying the location information of the potential customers. For example, a merchant may be shown an interface with a map that displays dots or other indicators where each of the potential customers is located. Such information may be live locations and/or historic locations. For example, a live location may be useful for a merchant at a current time, but a historic location information may be useful to display trends and/or predict other future behavior (e.g., choose when to open, choose where to locate, choose where to focus advertising, etc.).

Some embodiments may include triggering an advertisement or some other action based on location of a mobile device of a customer or merchant and/or number of people in a location. For example, in some embodiments, a merchant may establish a promotion to be transmitted to potential customers (e.g., all, nearest set) based on a number of potential customers in an area (e.g., an area around the merchant) exceeding a threshold and/or be lower than a threshold. For example, a merchant may submit information identifying the promotion of a service and when the service determines that the criteria are met, may transmit the promotion to the potential customers and/or identify to the merchant that the criteria are met. For example, such a promotion may give the first X customers a discount, thereby encouraging the potential customers to quickly place orders with the merchant, the promotion may simply be a paid advertisement for the merchant that is triggered based on the potential effectiveness calculated form the number of potential customers.

Similarly, a delivery agent may be shown such potential customers and/or potential merchants in a display. The delivery agent may use that information to determine where to situate himself while awaiting work (e.g., to maximize exposure to as many possible merchants).

Mobile Delivery Examples

Some embodiments may include interactions involving a mobile device of a delivery agent and/or the mobile device itself. For example, such a mobile device may include a smartphone.

In some embodiments, a mobile device may execute a delivery facing application (e.g., an android application, an iOS application, a windows phone 7 application, and so on). Such an application may interface with a system such as 101 above (e.g., through the internet, using one or more communication messages such as an html message). In some embodiments, such a delivery facing application may allow a delivery agent to access order information, historic information, location information, and so on. In some embodiments, such an application may allow a delivery agent to view new orders for delivery, confirm delivery, modify, or reject the orders, enter information about the orders, and so on.

In some embodiments, a delivery agent may be assigned to a particular order. Any method of choosing a delivery agent for any order may be used. Some examples, such as auctions, dedicated providers, random selection, closest, user selected, merchant selected, and so on may be used. An assignment may occur by a service such as service 101. In response to such an assignment, a delivery agent may be notified of an order to be delivered. A notification may be made through a mobile application. Such a mobile application may rely upon pushing of information to the application from the service and/or pull of information (e.g., polling of the service) from the service.

Through a mobile application, a delivery agent may confirm an order, reject an order, modify parameters of an order, and so on. For example, a control may be operated to send a message to a service that the delivery agent accepts an order. In response a service may mark a delivery process as accepted and unless some problem occurs assume that the delivery will be fulfilled. As another example, a control may be operated to send a message to a service that a delivery agent rejects an order. In response a service may assign another delivery agent in any desired manner, cancel an order, notify a customer and/or merchant of a cancelation, and so on. As yet another example, if a delivery agent operates a control to modify an order (e.g., adjust a pickup time, adjust a delivery time, adjust a location, etc.) a customer and/or merchant may be notified, a negotiation may begin, a customer and/or merchant may be asked for approval, and so on.

In some embodiments, a mobile application may be used to bid on and/or express interest in a possible delivery. For example, a service may receive an order and in response, transmit the opportunity to deliver that order to mobile devices of a set of delivery agents. The delivery agents may enter an amount that they would charge to perform the delivery through the mobile application and/or any other parameters (e.g., time). The service may pick a service provider that may deliver the cheapest service and/or use any comparison of bids (e.g., closest time).

In some embodiments, a service may choose the set based on received location and/or directionality information about one or more delivery agents. For example, a service may send delivery opportunities to a set of delivery agents that are in a general area of a merchant where pickup may be desired (e.g., in response to the merchant confirming the order, in response to the merchant confirming a time of pickup, in response to a time of pickup nearing, after some time from receipt of an order, etc.). As another example, a service may determine that one or more delivery agents is or will be passing near a merchant where a pickup is requested (e.g., on the way to perform another delivery) and may choose to send a request to that delivery agent. In some embodiments, a service may choose a successive set of delivery agents to offer the delivery to (e.g., in order of closeness to the merchant). For example, the service may determine an expected price for the delivery (e.g., based on a price per mile (e.g., 5 cents, 25 cents, 1 dollar, 5 dollars, etc.), based on a flat fee (e.g., 1 dollar, 3 dollars, 5 dollars, 10 dollars, 50 dollars), etc.). If a delivery agent accepts, then no further delivery agents may be queried in some embodiments. If a delivery agent rejects, then a next closest may be queried until one is found. If none are found within a reasonable distance (e.g., some threshold distance) then a higher price may be tried in the ordering of proximity to the pickup. In some embodiments, if a route of a delivery agent is known, the ordering may take the route into account in determining ordering (e.g., combination of distance to pick up and drop off is minimized). It should be recognized that such examples are non-limiting and may be combined in any way with other embodiments and/or alternatives such as favored delivery agents, business logic, and so on.

In some embodiments, a possible route between a pickup location and a delivery location may be determined. In some embodiments, a route between a current delivery agent location and a pickup location may be determined (e.g., before pickup). In some embodiments, a route between a current delivery agent location and a delivery location may be determined (e.g., after pickup). In some embodiments, such determinations may be made based on gps locations, by a service, by a third party, by a mobile application, and so on. In some embodiments, such routes may be presented to a delivery agent to ease in delivery. For example, a delivery agent may accept an order and in response may be presented with directions to a pickup location and then a delivery location.

In some embodiments, a delivery agent may be offered more deliveries based on a determined route. For example, if an order comes includes a pickup near the route, if an order exists that includes a pickup along the route, and so on. In some embodiments, an estimated delivery time may be presented to a user and may be adjusted based on an ordering of pickups given to a delivery agent. For example, if a delivery agent has accepted three pickups along a route from a first merchant to a first destination, the times for estimated delivery to the first destination may be increased to offset the pickup times at each of the other three locations, the delivery times at the final destination may be increased to account for the other deliveries and pickups.

In some embodiments, a delivery fee due to a delivery agent may be adjusted based on a route determination. For example, a delivery fee may include a time based and/or distance based fee. Accordingly, a fee may increase and/or decrease if a distance and/or time increases and/or decreases.

In some embodiments, a location of a delivery agent may be received by and/or relayed to a customer and/or a merchant. For example, a service may track a location of a delivery agent on its way to a merchant and/or between a merchant and a customer. The location of the delivery agent may be presented to the merchant on its way to the merchant so that the merchant may prepare for a pickup and/or presented to the customer on its way to the customer so that the customer may prepare for a drop off.

In some embodiments, a merchant and/or user location may be tracked (e.g., using a mobile application on a respective mobile device). Such tracked location(s) may be presented to a delivery agent. Accordingly, a delivery agent may be able to pick up from a moving merchant by maintaining an updated location of the merchant. Accordingly, a delivery agent may be able to deliver to a moving customer by maintaining an updated location of the customer. Such location information may be received by a service and used to create rout information and/or present directions and/or locations to a delivery agent.

In some embodiments, a tracked location of a delivery agent may be used to adjust an estimated pickup time for a merchant and/or an estimated delivery time for a customer. For example, if it is observed based on received location information of a delivery agent that the delivery agent is moving slower than thought towards a merchant and/or customer, the delivery estimated time may be increased. Conversely, a faster moving delivery agent may have time decreased. In some embodiments, a mobile application may allow a delivery agent to enter information about a condition of a delivery operation (e.g., stuck in traffic, five minute delay, need gas, accident occurred, pulled over, and so on). Such condition information may be used to adjust a delivery estimated time and/or cause some other action to be triggered. For example, a condition that a delivery agent needs gas may add five minutes to a delivery estimate. As another example, a condition that a delivery agent was in an accident may cause a replacement order to be placed and a second delivery agent to be sent. As yet another example, a condition that a delivery agent has been pulled over may cause another delivery agent to be tasked with finishing a delivery by going to the location of the first delivery agent and acquiring the goods and completing a delivery. Such a replacement task may be facilitated based on location information of the first delivery agent, based on a bidding process to determine the second delivery agent, based on proximity of the second delivery agent, and so on. It should be recognized that these examples are given as non-limiting and that various functionality may be used together in any combination for any purpose with any alternatives.

In some embodiments, a reminder may be sent to a customer and/or merchant based on a location of a delivery agent. For example, an SMS message, a phone call, an email, and so on may be transmitted to a customer when a delivery agent is near the user (e.g., within 5 minutes, at a lower level of a building, and so on). Similarly, a communication may be made to a merchant when a delivery agent is near the merchant for a pickup. Accordingly, the merchant and/or customer may be ready for the pickup and/or delivery to increase utilization of the delivery agent's time and minimize waiting time. Accordingly, a delivery and/or referral service that utilizes such functionality may be able to use few delivery agents to provide a same or greater amount of deliveries than a service that uses more delivery agents. Such delivery service may then be offered for a lower cost to merchants and/or customers in some embodiments.

In some embodiments, a delivery agent may use a delivery agent facing mobile application to turn on and/or off their status as a delivery agent. For example, a delivery agent may log into a mobile application to signify that they are available for orders to be sent to them (e.g., based on a prearranged fee schedule, to bid on orders, etc.). A service may determine which delivery agents to use based on which delivery agents are logged into a mobile application (and/or other elements such as location, time, prearranged contracts, auctions, etc.).

In some embodiments, a person (e.g., a person shopping at a store, driving down a street, etc.) may become a delivery agent by installing and logging into a mobile application. For example, a person doing grocery shopping at a grocery store may log into a mobile application on their way to, at, before going to the grocery store. That person may identify that they are going to the grocery store, and/or the service may determine their location at the grocery store based on gps or other location services. In response, the person may be identified as a potential citizen delivery agent from the grocery store and/or stores nearby. If an order comes in for the grocery store, that citizen delivery agent may be sent the order for delivery. Accordingly, any person, in some embodiments, may become a possible delivery agent as they go about their daily routine. Those people may then earn money (e.g., a delivery service fee) for performing services as they go about activities that they would otherwise be doing anyways.

In some embodiments, merchants, customers, delivery agents, and so on may specify types of agents and or orders that they may be willing to participate with. For example, a merchant and/or customer may choose not to allow citizen delivery agent pickups but rather choose to only allow professional delivery agents to pick up. In some embodiments, a delivery agent may set types or sizes of orders (e.g., no hazardous materials, no goods over a hundred pounds, no hot goods, no meat), may set locations for delivery and/or pickup (e.g., only deliver in 1 mile of my house for a citizen delivery agent and only pick up from 1 mile from my current location). A service may use such information to determine which delivery agents to send possible orders to.

A mobile application may present identifying information about a customer and/or merchant to a delivery agent to ease in the pickup and/or delivery process. For example, a picture of a customer and/or a picture of a location for a drop off (e.g., front of a house, part of a park) may be presented to a delivery agent. Such a picture may be taken from a stored inventory of ID pictures that as discussed elsewhere herein may be cataloged to verify identity (e.g., for alcohol delivery, for credit card verification, etc.). Such a picture may be sent from a user and/or merchant mobile device to aid in a particular delivery and/or cataloged from past deliveries to aid in future deliveries. In some embodiments, a picture of a merchant may be shown to a delivery agent. For example, the picture may help the merchant find a location for a pickup and/or delivery. In some embodiments, a video may be shown (e.g., a video showing how to get to a location) and/or a picture with some augmentation may be shown (e.g., arrows indicating location or directions).

In some embodiments, a delivery agent facing mobile application may utilize a camera of a mobile device. For example, a delivery agent may scan a coupon of a customer (e.g., a bar code, a QR code, etc.). The scanned coupon information may be sent to a service, merchant, and/or third party (e.g., manufacturer) for use in determining validity, price adjustment, counting the coupon as used, analytics, and so on. For example, a service may maintain coupons that can be used only once and have unique bar codes (e.g., coupons it provides, coupons provided by the merchant and information shared with the service, manufacturer coupons maintained by the service, etc.). The service may receive the bar code and determine whether it is valid by comparing it to a list, determine whether it has been used before, and if so respond by adjusting a price. The price may be adjusted by changing a charge to a credit card, identifying to a delivery agent an adjusted balance, and so on. In some embodiments, the customer may identify the coupon and the price may be set at a time of ordering and an adjustment of price may be made if the coupon is determined to be invalid or already used. In some embodiments, a manufacturer and/or merchant may maintain coupon information and an interface with a system a database maintained there may be used to determine validity and/or uniqueness of a coupon. In some embodiments, a coupon may be non-unique.

Another example of a mobile application using a camera of a mobile device may include capturing ID pictures (e.g., drivers licenses). Such pictures of an ID of a customer may be captured by a camera and maintained as a record by a mobile application to verify identity of a customer (e.g., age) for delivery of certain goods (e.g., alcohol, guns) and/or all goods. In some embodiments, such information may be transmitted to a service, a merchant, and/or a third party (e.g., a governmental agency) for comparison and/or verification. A verification may be sent to a delivery agent if the identification matches stored information about the customer. In some embodiments, the ID information may be stored by a service, a merchant, and so on. Various regulations of different jurisdiction and different goods may vary and so treatment of such ID information may vary.

Yet another example of a mobile application using a camera of a mobile device may include using a camera to scan a code (e.g., a QR code) from another mobile device (e.g., of a customer and/or merchant). For example, a customer may be sent a QR code to show a delivery agent upon delivery and the delivery agent may scan the QR code from the customer device to identify that delivery has been completed to the correct person. Such confirmed delivery may be used to verify an identity of a customer (e.g., if the customer is in a highly crowded or unregulated area such as a park and receiving delivery there, when a proper delivery confirmation is important such as for legal documents, and so on). As another example, a merchant and/or delivery agent may be presented with a QR code and the other may scan the QR code with their camera to identify pickup. Accordingly, an entire chain of custody may be tracked and verified to be correct.

In some embodiments, a picture may be taken using a mobile device upon pickup and/or delivery by a merchant and/or delivery agent. For example, a merchant may use a merchant facing application to take a picture of the condition of goods upon pickup. Similarly, a delivery agent may take a picture of goods to verify their condition upon pickup and/or delivery. A delivery agent (and/or picker/packer which may be separate from or same as delivery agents and/or merchant) may scan barcodes on items as they are picked, packed, bought, picked up, etc. to indicate that they have been obtained. A service may track such scanning to determine if an entire order has been completed or if items are missing. A service may track such scanning to coordinate multiple pickers or packers as described elsewhere herein.

In some embodiments, a picture may be taken of a merchant and/or customer by a delivery agent so that a record of the pickup and/or delivery is made. For example, a record may prevent a customer from contesting that the delivery was made. Such picture may be recorded by a mobile application and/or by a service in a database that links order information with the picture so that future access can quickly determine that a picture was taken for a particular order by searching the database.

In some embodiments, a mobile application may be used to allow direct contact with a merchant and/or customer by a delivery agent. For example, a delivery agent may call a merchant and/or customer to coordinate pickup and/or delivery, and so on.

In some embodiments, a form of communication such as optical, Wi-Fi, Bluetooth, NFC, and so on may be used between a delivery agent mobile application and a customer and/or merchant mobile device. For example, mobile devices may be bumped to identify a transfer of goods from one user to the next thereby tracking a chain of custody of an order. In some embodiments, such tracking of responsibility for goods may include any number of delivery agents, service providers, and so on. For example, delivery may involve multiple delivery agents in a relay and the current responsible agent may be tracked (e.g., through such bumping and/or through a location tracking system so that when they approach one another and move apart it is assumed that responsibility has changed).

Mobile Customer Examples

Some embodiments may include interactions involving a mobile device of a customer and/or the mobile device itself. For example, such a mobile device may include a smartphone.

In some embodiments, a mobile device may execute a customer facing application (e.g., an android application, an iOS application, a windows phone 7 application, and so on). Such an application may interface with a system such as 101 above (e.g., through the internet, using one or more communication messages such as an html message). In some embodiments, such a customer facing application may allow a customer agent to access order information, historic information, location information, and so on. In some embodiments, such an application may allow a customer to view new orders for delivery, place orders, edit orders, confirm delivery, view order history, manage receipts, manage coupons, and so on. A customer may include an ordering customer, and/or a customer to whom an order is sent. Such customers may be a same customer and/or a different customer.

In some embodiments, a customer may move locations from time to time when a delivery is incoming. For example, a customer may order lunch in a park. While in the park waiting for lunch, the customer may move from location to location within the park. Such location may be tracked and sent to a delivery agent and/or service. The updated location and/or direction to the updated location may be received to a delivery agent so that the delivery agent can find the customer to complete delivery. As another example, a law firm may desire to deliver a letter to a client and the client's movement may similarly be tracked to determine a delivery location. Accordingly, by using such functionality, a customer may be able to make some movement from location to location while a delivery is incoming.

In some embodiments, a customer location may be compared with a delivery location and/or delivery agent location. Such a comparison may result in a message being sent to a customer and/or delivery agent. For example, a service may estimate delivery location to be at a ground level of a building and may determine that a customer is at a high elevation than ground level. The service may determine an expected time to go from a current level to a ground level for a pickup of a delivery. Such time may be compared to a time that the delivery agent is away from a delivery location. In response to a determination that a delivery agent is in and/or near a time that it may take for a customer to reach the delivery location, the customer may be notified to depart for the delivery location and/or the delivery agent may be notified to contact the customer. Although altitude is used as an example, it should be recognized that any distance of customer from a delivery location may be used (e.g., park entrance as delivery location and distance from park entrance as distance).

In some embodiments, a mobile application may direct a customer to a delivery agent and/or vice versa. For example, a delivery agent may notify a service and/or customer that they are at a location. The location may include a large location like a park where it may be difficult to find a particular person. A service may send a route information and/or location information for the customer and/or delivery agent to the other so that they may find one another to complete the delivery.

In some embodiments, a mobile application may manage coupons and/or receipts for a customer. Such a mobile application may locally store such information and/or store it with a service (e.g., 101). For example, for each order from a merchant, the merchant may send the service a receipt. A user may use the mobile application to search for receipts (e.g., by merchant, by date, by item, and so on). A database of receipts may be searched for such information. The customer may show the receipts to a merchant using the mobile application and/or have a copy sent to a merchant facing application through a service. Accordingly, a customer may be able to return goods without maintaining copies of receipts. In some embodiments, orders made without use of a service may also have receipts entered into a management database (e.g., a merchant may know that a user uses a service and have receipts sent to a database for the user). Similarly, a user may store coupons (e.g., electronic coupons) in such a searchable database. Near field communication and/or other location service may be used so that a coupon may be added to a user's account for entering a location and/or a user may be notified of a coupon when entering location. For example, a customer may be given a coupon after entering a store 10 times, entering a competitors store 10 times, and so on. The customer may be reminded of the coupon when passing the store (e.g., by a text message, a pop up from the mobile application, and so on). In some embodiments, customers may take pictures of coupons (e.g., scan codes) to have the coupons added to a coupon wallet service. The coupons may be accessed at a later date as desired (e.g., images may be shown of the coupons that may be scanned by another device).

In some embodiments, a mobile application may allow a customer to take a picture of identification (e.g., driver's license) for verification of the user's identity and/or age. For example, before a user may order alcohol, a user may be required to take a picture of an ID and send the ID to a service to maintain as a record and/or verify.

In some embodiments, a mobile application may display a QR code or other code that may be read by another mobile device to verify identity or delivery. For example, a customer device may display a QR code that a delivery device may read through a camera and/or vice versa. Similarly, a code for a coupon may be displayed for reading by another device.

In some embodiments, a mobile application may allow direct contact with a delivery agent and/or merchant. For example, a customer may call a delivery agent that has their goods and/or a merchant form which they ordered goods. In some embodiments, for example, such calls may be made without a user knowing the information. For example, a user may click on a contact agent control and a mobile application may request a delivery agent phone number from a service, the service may transmit the number to the mobile application, and the mobile application may control the mobile device to call the delivery agent. Similarly, a merchant and/or delivery agent may use mobile applications to contact participants in a delivery relationship without having to lookup and/or know such information. A service may maintain a database of merchant numbers, delivery agent numbers, customer numbers and a combination of such participants that may be involved in any particular order. Such databases may be queried to determine phone information for any particular order for which one participant desires to contact another participant. In some embodiments, participant in an order that is currently responsible for the order (e.g., the merchant if the order has not been picked up, the delivery agent if the order has been picked up) may be tracked (e.g., as discussed elsewhere) and contacted if a customer chooses a contact control.

Some embodiments may include identifying goods by a mobile device (e.g., a smartphone). For example, a customer may scan a UPC code of a good into a smartphone as an identification of the good. Such identification of the good may be used to facilitate delivery of the good.

In some embodiments, identification of goods for an order may be performed by using a camera of a mobile device. For example, a customer may take a picture of a product and/or bar code, scan a bar code, enter information identifying a product, and so on. Such information may identify goods for an order. In some embodiments information transmitted about a good may include a picture of the good, a description of the good, a code (e.g., a UPC) identifying the good and so on. Such information may be sent to a delivery agent, merchant, picker, packer, and so on to facilitate delivery.

In some embodiments, information identifying goods for an order may be transmitted to a delivery/referral service. The delivery/referral service may facilitate delivery of the goods to the customer (e.g., a destination identified by the customer). Various examples of facilitating delivery are given herein. In some embodiments, facilitating delivery may include facilitating a picking and/or packing of the goods. Facilitating picking of the goods may include transmitting an indication to a delivery agent and/or picking agent of the goods to be picked (e.g., collected for the order). The agent may go to the store and pick the goods from the shelf. In some embodiments, a merchant may pick goods for themselves.

In some embodiments, any desired characteristics of a delivery may be entered through a mobile device interface and/or transmitted to a delivery/referral system. For example, a customer may identify quantities of a good, time for delivery, location for delivery, and so on through an interface of a mobile device. Such information may be transmitted for use in facilitating delivery of the goods.

In some embodiments, merchant information may be included in information identifying an order and/or goods. Such merchant information may identify a merchant. Merchant information may be entered by a user through an interface. In some embodiments, merchant information may include gps coordinates of the merchant. Such information may be transmitted based on the location of the mobile device at a time of scanning or other identification of a good. Such gps information may include an averaging of gps coordinates of a plurality of goods, a plurality of gps coordinates corresponding to respective goods, and so on. For example, such gps coordinates of a plurality of goods may be used by a picking agent to more quickly locate goods (e.g., by going to the gps coordinates). Accordingly, such gps information may be transmitted to a delivery agent, a picking agent, a merchant, and so on. Such gps information may be used to identify a merchant to send payment and/or order information to (e.g., based on recorded gps information of the location of the merchant in a database of merchant gps information. For example, gps coordinates may be matched in a database of merchant gps coordinates by a delivery/referral system to determine a merchant to transmit order information to and/or allocate payments to. It should be recognized that although gps coordinates are given as an example, any location information may be used in various embodiments, such as a triangulated location, an estimated location, a location based on wireless network signals, and so on.

Figure 2:
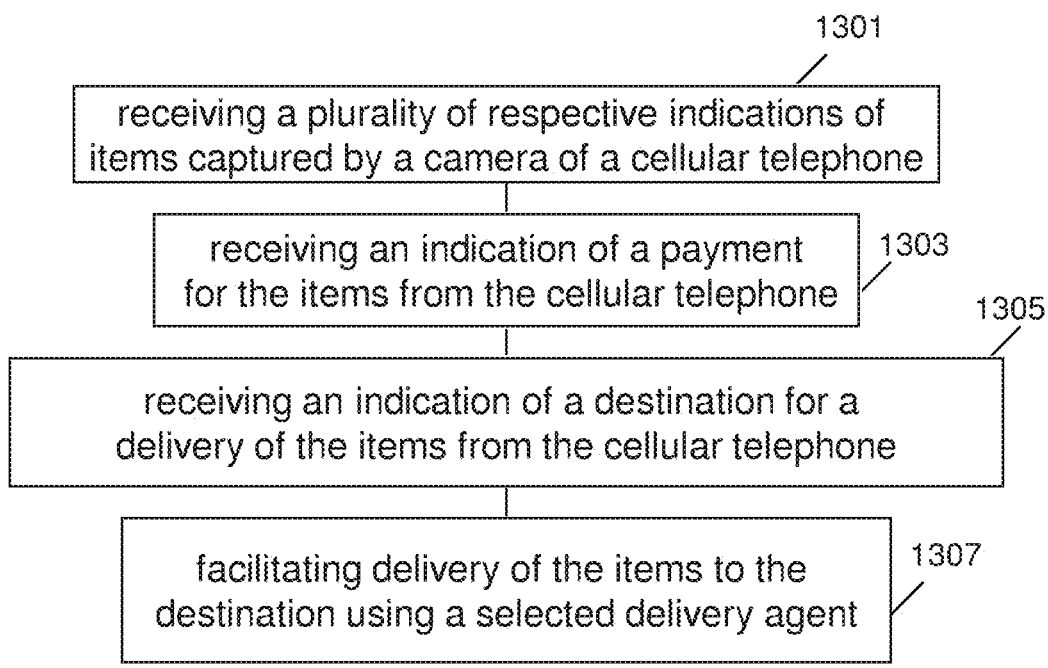
FIG. 2 depicts yet another example method according to at least one embodiment disclosed herein.

FIG. 2 illustrates an example method that may be used in some embodiments. As indicated at block 1301, such a method may include receiving a plurality of respective indications of items captured by a camera of a cellular telephone (e.g., barcodes, pictures). As indicated at block 1303, such a method may include receiving an indication of a payment for the items from the cellular telephone. As indicated at block 1305, such a method may include receiving an indication of a destination for a delivery of the items from the cellular telephone and/or any other order related information (e.g., merchant, location of scans, time of delivery). As indicated at block 1307, such a method may include facilitating delivery of the items to the destination using a selected delivery agent (e.g., selecting an agent to pick/pack, selecting a delivery agent, auctioning service providers, information).

Although some embodiments have been described with respect to delivery from one merchant, it should be recognized that a mobile device may be used to enter an order for goods from multiple merchants. Various examples of facilitating delivery from multiple merchants are given herein.

Mobile Pickers, Packers, and Other Service Providers

Some embodiments may include interactions involving a mobile device of a service provider in a delivery and/or the mobile device itself. For example, such a mobile device may include a smartphone.

In some embodiments, a mobile device may execute a provider facing application (e.g., an android application, an iOS application, a windows phone 7 application, and so on). Such an application may interface with a system such as 101 above (e.g., through the internet, using one or more communication messages such as an html message). In some embodiments, such a provider facing application may allow a service provider to access order information, historic information, location information, and so on. In some embodiments, such an application may allow a service provider to view new orders for delivery, confirm delivery, modify, or reject the orders, enter information about the orders, and so on.

For example, some service providers may include a person that picks goods from a shelf, a person that packs goods into bags, a person that holds goods between relaying from one delivery agent to another delivery agent, a quality inspector, a receiver that receives goods for a customer, a loader/unloader that loads and/or unloads goods from a delivery agent, and so on. Such service providers may be assigned to an order in any manner, such as an auction mechanism described with respect to a delivery service provider. In some embodiments, a delivery agent may perform all or most of such functions.

Similar to delivery agents, citizen service providers may use a mobile application to turn on and/or off their ability to take part in a delivery process by logging into a mobile application (e.g., pick and/or pack at a grocery store they are shopping at and allow a delivery person to make the delivery). Any combination of service providers and/or delivery agents may take part in a single order or combination of orders and may share some fee for their services. Such service providers may be assigned work based on bidding, location, availability, and so on.

Mobile applications may allow coordination with multiple service providers. For example, a set of pickers at a grocery store may be assigned to pick for one or more orders. The pickers may be shown a list of goods. As they pick from the list, they may use a camera of a mobile device to scan the items. The items may be removed from the list shown to the pickers. Accordingly, the pickers may operate on a list of goods to be picked in a coordinated fashion without duplicating picks. If a duplicate is picked, a mobile application may notify the pickers not to pick the duplicated good. A service may receive information identifying picks and may update a list accordingly and then send the updated list to the service providers.

Similar to delivery agents, mobile applications may be used to track a chain of custody for any number of service providers. For example, each of a picker, packer, delivery agent, holder, receiver, loader, and/or unloader may scan IDs, take pictures of goods and/or other providers, scan QR codes of other goods, have locations tracked, and so on to determine which service provider has responsibility for a delivery at a particular time.

Mobile applications may be used by service providers to make direct contact with other service providers. For example a picker may use a mobile device to call a packer, a packer may use a mobile device to call a loader, a loader may use a mobile device to call a delivery agent, and so on. Each provider may not know the information about a next provider to be contacted, but a service may maintain such records, so that upon operating a control to contact next provider, the mobile device may be controlled to call a next provider in a chain of providers.

Mobile applications may track and/or identify locations of current and next service providers. For example, a picker and packer may share each other's location so that they may meet to offload goods. A packer may be shown where a delivery agent is and vice versa so that a pickup may occur.

Grouping and/or Temporary Business/Social Network

In some embodiments, a service may determine a set of participants in a delivery transaction (e.g., customer, merchant, delivery agent, other service provider). The service may form a temporary business and/or social network involving the participants until the delivery is complete. Through such a network, participants may track one another, obtain updates regarding one another, chat with one another, and so on.

In some embodiments, participants may be entered into a group chat together. For example, participants may be placed into a chat room run by a service that may be accessed through mobile applications. Accordingly all and/or some participants may be able to communicate together regarding an order (e.g., update status, request status, and so on).

Examples of Assignment of Service Providers

In some embodiments, a service may assign an active delivery agent to an order based on a proximity of the delivery agent to a pickup location (e.g., at a pickup time, at an order time). For example, a service may determine based on delivery agents logged into a mobile application, a set of active delivery agents. The service may determine that a delivery agent closest to a merchant where an order is to be picked up from should deliver the order. The service may make such a determination in response to receiving the order, in response to some amount of time passing (e.g., an amount of time relative to an amount of time to prepare the order (e.g., 2 minutes less, 2 minutes more), an amount of time identified by a merchant, at relative to a time identified by a merchant (e.g., pick up time), and so on).

In some embodiments, a service may determine a route (e.g., approximate, estimated) of a delivery agent. Such a route may include a route to make another delivery. Such a route may include a destination to make another delivery. Such a route may be used to estimate locations at a pickup time. Based on such estimation, an active delivery agent may be selected to make a delivery.

In some embodiments, delivery agents already making a delivery may be ignored in such a calculation.

Some embodiments may include assigning a delivery to a favored delivery agent of a merchant, user, service, and so on. For example if a particular agent is available that is liked by a service (e.g., offers a lowest rate, performs best), that delivery agent may be given preference over another delivery agent. A service may determine favored delivery agents based on a bidding process, based on contracts, based on relationships, and so on. A service may receive information identifying favored delivery agents from a merchant and/or a customer.

Some embodiments may include determining a delivery agent based on a bidding process. For example delivery agents may be allowed to bid for providing delivery services (e.g., individual services in response to orders, future looking orders based on slices of time and/or locations, and so on). Various examples of such bidding are given herein (e.g. with respect to FIG. 3).

Some embodiments may include auctions for future services. In some embodiments, time slices and/or locations may be auctioned. For example, a time between 2 and 3 pm may be auctioned. As another example, destinations in the Chicago Loop may be auctioned. As yet another example, sources and destinations that are within 1 mile of O'Hare airport and for the hours between noon and 6 pm on a particular day may be auctioned.

In some embodiments, any number of delivery agents may submit any number of bids to gain responsibility to make such deliveries. In some embodiments, the bids may include a flat fee for all deliveries (e.g., 50 dollars to make all deliveries). In some embodiments, the bids may include a fee per delivery, fee per mile, and so on.

In some embodiments, an interface may allow delivery agents to submit bids to a service. A service may receive bids and determine a winner for an auction based on bid amounts (e.g., lowest bid wins, lowest bid adjusted by some business logic such as customer reviews or other bidding parameters may win). In some embodiments, delivery agents may be removed or disqualified from an auction in response to customer and/or merchant complaints and/or reviews not meeting a threshold.

In some embodiments, an auction may be held a time period before the time slice being auctions (e.g., one week, one hour, one day). In some embodiments, an auction may last some amount of time. In some embodiments, an auction may include a standard auction, a blind action, a reverse auction, and so on.

In some embodiments, an auction may include a volume matching auction. In some an auction, for example, delivery agents may submit bids to a service during a time period of the auction. The bids may be kept hidden from other delivery agents. At the end of the rime period, the service may select the best bids to fill an expected need. For example, a service may choose the best bid and agree to assign all orders in that slice of time and/or location to the delivery service that won the auction. In some embodiments, a bid may include a quantity of orders that can be handled, and the service may choose a quantity of delivery services based on bids to fulfill an expected quantity of orders for the time period (e.g., based on history). Accordingly, a volume of orders may be matched to a volume of delivery services for a slice according to an auction process.

In some embodiments, in which multiple delivery agents are selected through an auction, they may be given preference based on price so that when an order comes in that relates to the slice, the agent with the lowest bid that is available for a new order may be given the order. They may be assigned orders in preference to their bid rank. Accordingly, a service may assign an agent associated with a best bid that is available to each order for a slice.

In some embodiments, a delivery agent may agree to be available for all orders related to a slice (e.g., may not take other business during a time). So that a delivery agent may be unavailable only when fulfilling another order for a service. In some embodiments, after an auction, if a delivery agent comes in first, second, third, and/or so on, the delivery service may be asked to confirm that they agree to this availability restriction. In some embodiments, such a restriction may be placed on all bidders before bids are accepted. Some embodiments may not include such a restriction. In some embodiments, such an availability restriction may include a minimum deliveries per hour, per time period, per slice (e.g., the volume bid amount), and so on that may be met instead of complete availability.

In some embodiments, if an expected volume is not met, another auction may be held. For example, if a first place bidder wins but cannot provide a sufficient amount of deliveries related to a slice, and all other bidders decline an availability restriction, a second auction may be run. The second auction may identify that it is for a secondary/spill over slice.

Any number of auctions may be run until a desired volume of deliveries is agreed upon. Such a system may allow a service to set prices for delivery in advance at a competitive rate. Overflow deliveries may be fulfilled in any manner.

It should be recognized that various examples of assigning may be used in any desired combination and are non-limiting. As examples: a bidding process for a specific order may be limited based on a proximity system so that only agents in a proximity part of an auction; if a favored delivery agent is unavailable, a merchant that wins a slice of time auction may be used; and so on.

Further Auction Examples

Some delivery situations may face different delivery challenges. For example, a delivery in a perishable goods environment, such as a restaurant, may include industry elements that are in place to facilitate some delivery services (e.g., a last mile provider already hired by a restaurant such as a third party restaurant delivery service or a delivery driver of the restaurant). In some environments, delivery may be uncommon or not provided at all and providing delivery may include providing all elements of the delivery without reliance on a pre-existing structure for delivery. Accordingly, last mile providers may be expected to perform different tasks and/or be required to provide different services in different environments for different merchants and/or customers. Although delivery providers may be referred to as last mile providers, it should be recognized that last mile may not refer to an actual unit of measurement but rather is used as a colloquial phrase.

In some embodiments, a service (e.g., 101) may provide a desired level of service based on infrastructure in place for a particular delivery. For example, for a restaurant with a delivery person, the service may fax an order to the restaurant and allow the restaurant to provide the delivery. As another example, for a department store that does not provide delivery services, a service may arrange for a picking, a packing, and/or a delivery from a third party. Some merchants and/or deliveries may require specialized equipment (e.g., large furniture delivery) that may be facilitated by a service. It should be recognized that any combination of services as required to facilitate a delivery may take place. A merchant may identify to a service the needs for delivery so that in response to an order, the required services may be facilitated.

Some embodiments may access a network of last mile providers to provide various elements of a delivery. Such a network may include a local and fragmented market (e.g. made up of individual vehicle owners, individuals, confederated, renters, taxi drivers, truck drivers, large services, and so on). Such last mile providers may be used to provide delivery from services that do and/or do not have proprietary delivery services or previously established delivery service relationships. In response to an order, a service may route an order to a merchant and/or a last mile service provider that the service decided should be used to provide the delivery service. Any number of other and/or additional service providers may be used and may have orders routed accordingly (e.g., pickers, packers, holders, and so on).

In some embodiments, a last mile provider and/or other service provider may be chosen in advance and/or in response to an order being received. Various examples of choosing a last mile provider are given herein and may be used in any combination.

In some embodiments, a last mile provider may be chosen in advance of an order by way of an auction based system. Any last mile providers may access and bid in such an auction system. In some embodiments, last mile providers may be vetted before they are allowed to enter an auction (e.g., sign onto an auction system, bid in a particular auction). For example, a last mile provider may be required to verify that they have equipment that can handle a delivery before bidding on a delivery, place an amount of money into a bond before they are allowed to bid on a delivery, submit identifying and/or operating information (e.g., delivery areas, weight restrictions, contact location, etc.) before they are allowed access to a system, and so on.

Auctions and/or bids may identify characteristics for a delivery and/or pricing for a delivery. For example, auctions may define orders based on a distance (feet, miles, suburban, rural, borough, metro area, city center, city area, etc.), a location, a time (e.g., priority, standard, same day, under 1 hour, under 3 hours, over 3 hours), a weight, hours (e.g., business hours/days, holidays), an amount of time, and/or any desired characteristics. Bids may be accepted for such auctions through such an auction system. In some embodiments, bids may identify one or more characteristics, such as price per distance, price per weight, weight maximum, weight minimum, distance minimum, distance maximum, and so on. In some embodiments, bids may be required to conform to auction characteristics rather than identify their own characteristics. Any desired method of choosing one or more winning bids may be used to cover an auctioned delivery service.

In some embodiments, a service may provide an interface through which last mile providers may view, bid on, search for and so on auctions by characteristics (e.g., by market and current bid price).

In some embodiments, selection of a winner of an auction may take place at a set time. Such a set time may be an amount of time after a starting time.

In some embodiments, any number of winning last mile providers may be selected. For example, a 1st, 2nd, and 3rd place winner may be selected. The lowest three bidders at an end of an auction period may be selected for such positions. The winners may be notified of their place in the auction.

In some embodiments, selection of a last mile provider to fulfill a delivery of an order may be made based on the ordering of the winners of the auction. For example, in response to an order being received that meets characteristics that define the order, a last mile provider may be selected. For example, the last mile provider may be selected so that the 1st place winner receives a percentage of deliveries, the 2nd place winner receives a second percentage of deliveries, and the 3rd place winner receives a third percentage of deliveries. In some embodiments, a 1st place winner may be favored for delivery if they are available. If they are not available, the 2nd place winner may be used if they are available, and so on.

In some embodiments, an auction may be run for a market and/or for characteristics periodically and/or as desired. For example, in some embodiments, an auction may be run once a month for a next month, daily for a next day, hourly for a next hour, and so on.

In some embodiments, an auction may include a blind auction. In some embodiments, an auction may not include a blind auction. In some embodiments, an auction may include a reverse auction. It should be recognized that any auction may be used as desired.

In some embodiments, a customer, a merchant, a service provider, and/or other entity may be notified of a price of delivery that is based on a bid submitted. For example, if a 1st place provider is selected, a customer and/or merchant may be shown a price related to the bid of the 1st place provider (e.g., a same price, a price with a markup). Similarly, if a second place provider is to be used for a delivery, a price relative to a bid by the second place provider may be shown. In some embodiments, the price relative to the first place provider may be used regardless of which provider is used.

In some embodiments, a provider may be paid based on a bid price. For example, a provider may bid an amount of money per mile, per delivery, per pound, and so on. Based on delivery details, the provider may be paid that amount after providing delivery services. In some embodiments, the bid may include a bid submitted by a provider and/or a bid submitted by another provider (e.g., the first place provider).

One example auction may include an auction for delivery less than two miles in Manhattan for items under 100 pounds between 7 and 8 pm tomorrow. It should be recognized that any manner of characteristics may be used in any combination to define an auction.

In some embodiments, a large scale delivery provider may form a relationship with a service such as service 101. Such a large scale delivery provider may agree to provide delivery services of over flow orders. A price negotiated with such a large scale delivery provider may be used as a starting point price for a reverse auction for delivery during a period of time when the large scale delivery provider agrees to make the deliveries.

In some embodiments, a volume of delivery may be established for an auction. For example, a number of deliveries may be desired for a particular time period that defines an auction. Winners may be selected to fill the desired number of deliveries. Each bid may identify a number of deliveries that may be provided at a price. In some embodiments, if the number of orders for the time is not reached, then a highest bid(s) may not be chosen. In some embodiments, a number of deliveries may be determined based on a historic number of deliveries for a time period.

In some embodiments, a price may be set for a particular auction. For example, an auction may say that a price for delivery with a particular characteristic is $X. During the auction, a service and/or outside services may choose to enter a volume of desired deliveries at that price. During that period, last mile providers may enter a number of deliveries that they may provide at that price. At an end of an auction, the providers and the volume of desired delivery may be matched together. For example, if a service desires to lock in 5 deliveries at $X then the service may enter 5 orders and up to 5 last mile provider bids may be accepted.

In some embodiments, such volume matching may be performed at any number of price points any number of times to fulfill a desired number of orders. In some embodiments, such an auction may take place before an order and/or after an order is received.

Some embodiments may include updating a volume desired for a particular time after an auction for that time has been completed. For example, in some embodiments, an expected volume of deliveries may increase (e.g., based on an expansion of services, based on an increase in usage of a service) between a date of an auction and a date for which an auction is held. In response, a second auction for an excess volume may be held.

Table A illustrates some example numbers and characteristics that are used as an illustration. Such table may illustrate a bid for a weeks' worth of deliveries, separate auctions (e.g., one for metro small, one for metro large, one for boroughs accessories. It should be recognized that any combination of characteristics may be used in bidding and/or auctioning as desired.

TABLE A

| | | Rates | | | |
|---|---|---|---|---|---|
| Dimensions | Weight * | Within Three (3) Hours | Within 90 Minutes | Unit of Measure | Specifications ** |
| Metro Small | Under 10 lbs | $11.00 | $16.50 | Per stop | Business |
| Metro Large | 10 lbs or more | $22.50 | $29.50 | Per stop | Hours |
| Boroughs | | $35.50 | $45.50 | Per stop | Apply |
| Accessories | More than five (5) pieces | $2.00 | $2.00 | Per piece | |

Example Auction for Specific Service Slot

In some embodiments, third party delivery agents, proprietary delivery agents, customers to whom a delivery is to be made, merchants themselves, and/or any other desired entity may compete in an auction to determine a service provider. For example, a third party service may place a bid against a delivery agent that normally works with a merchant and/or is paid by a merchant in an attempt to undercut the merchants normal delivery service in some embodiments. In some embodiments, a customer may place a bid and/or maximum delivery charge above which the customer will pick up from the merchant himself. In some embodiments, if no delivery agent bids less than the customer's bid, delivery may not be provided. In some embodiments, the customer may receive the bid amount. In other embodiments, the customer may not receive the bid amount. In some embodiments, third party delivery agents (e.g., cab drivers, truck drivers, college students with cars, and so on) may bid against one another.

It is recognized that a merchant may desire to provide delivery services to a user. It is recognized that a plurality of individuals may act as delivery agents independently and/or in connection with one or more merchants. In some embodiments, an auction may be used to determine an effective delivery agent for an order and/or set of orders from a particular merchant, from a set of merchants, during a time, to a location, and/or with any characteristic. Such auction system may be used to determine an effective service provider for any desired service (e.g., a packer, a receiver, a merchant itself, and so on).

Figure 3:
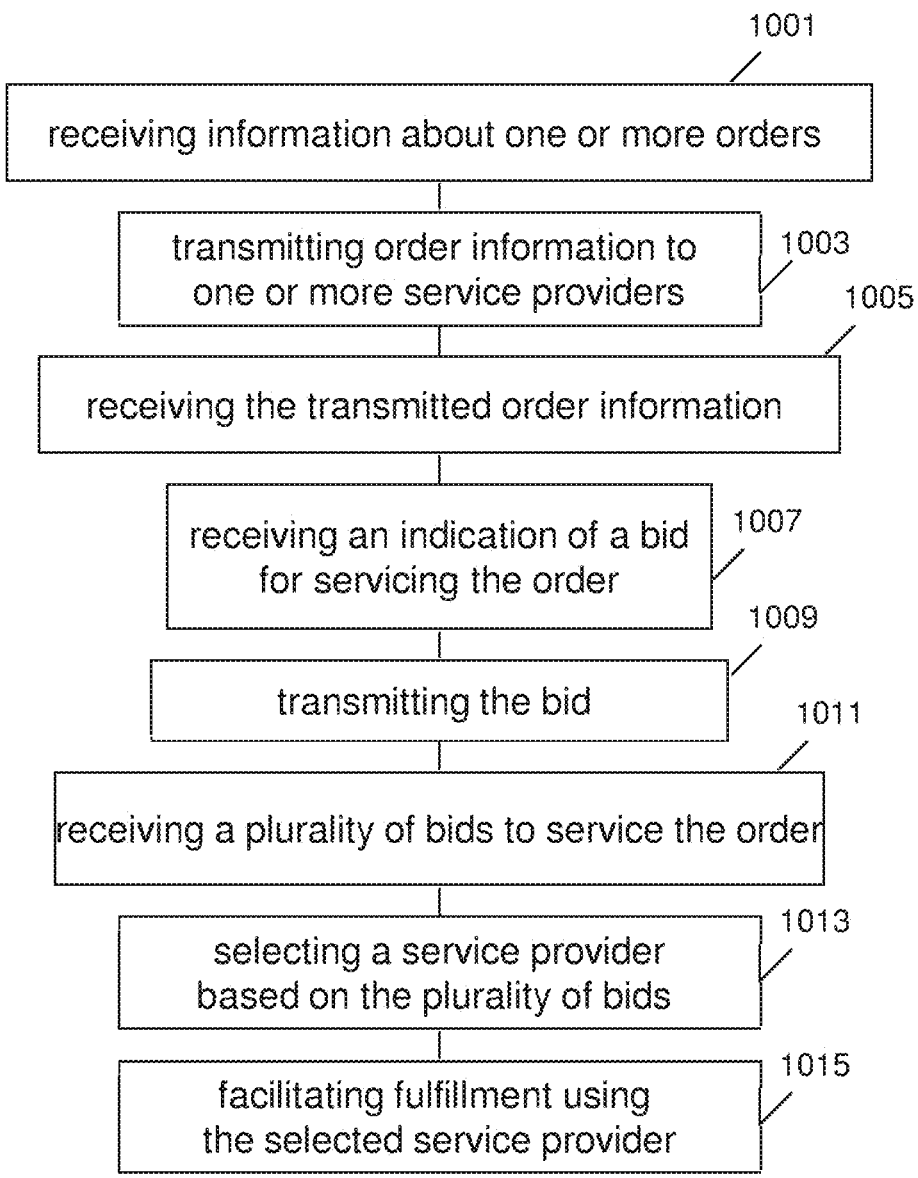
FIG. 3 depicts yet another example method according to at least one embodiment disclosed herein.

FIG. 3 illustrates one non-limiting example method that may be used in some embodiments. Such a process may be performed, for example by system 101, a user, a merchant, and/or any entity or combination of entities. Such a process may be performed by one or more servers and/or processors. Such a process may be used to determine a delivery agent for one or more orders.

As indicated at block 1001, some embodiments may include receiving information about one or more orders. Such information may include a location for delivery, a location for pickup, information about a merchant, information about items, a delivery time and/or time period, and so on. When location is referenced, it may include a location of a user, a location of a delivery, a location of a merchant, a location of a pickup, a location of a delivery agent, and/or any desired location. Various examples of order information and receiving are described elsewhere herein. Such an action may be performed, for example, by a user device, a merchant, system 101, and so on.

Some embodiments may include determining that an auction process for determining a delivery agent and/or any desired service provider should be performed. Such a determination may include determining that no other delivery agent has already been contracted to perform the delivery. Such a determination may include determining that a merchant does not have their own delivery service. Such an auction process may include part of the method in FIG. 10. Such an auction process for example, may include receiving bids, and determining that a delivery agent should perform a delivery based on the bids.

In some embodiments, such a determination may include making a determination that an auction should be used to determine a merchant from a set of merchants that may provide a good, a packer that may pack goods at a merchant, a picker that may pick goods from a set of goods at a merchant (e.g., pick fruit from a grocery store), a receiver that may receive goods at a delivery location, a payment processor from a set of payment processors, a searcher from a set of possible searchers (e.g., a person that searches for a good at a plurality of merchants), and/or any desired service provider such as one that may be involved in a placement, fulfillment, delivery, payment, and so on of a good from one location to another location.

As indicated at block 1003, some embodiments may include transmitting order information to one or more delivery agents and/or other service providers. Such information may be transmitted to a plurality of delivery agents that are part of an auction system for a particular geographical area. Some embodiments may include providing order information to one or more delivery agents in any manner including transmission. Such information may and/or may not include all information about an order (e.g., some information such as identities may be kept hidden for privacy reasons). Such information may include a next and/or prior service provider in a chain of service providers (e.g., a packer from whom receipt of goods is made, a receiver to whom goods are delivered). Delivery agents may register with such a service and indicate what types of orders to receive, when they operate, where they operate, a form to receive information in, and so on. Such transmitting may include transmitting via a central website that displays such information to delivery agents such as those that sign in. Such transmitting may include sending an email, a text message, a website, an electronic message, and so on. Such transmitting may include transmitting to a software program run by a delivery agent. Such transmitting may be performed in response to receiving the order information, may be performed in response to determining that an auction for a delivery agent should be performed, in response to determining that a merchant does not have a proprietary delivery agent, and so on.

In some embodiments, such transmitted information may include a desired level of specificity. For example, such information may include exact information and/or inexact information regarding time, locations, and so on. For example, an indication of a location may include an exact location (e.g., an address), an approximate location (e.g., a cross street, a region, a distance (e.g., exact, approximate) from another location, and so on).

Some embodiments may include filtering transmission of such information to service providers with desired characteristics. For example, such information may only be transmitted to a service provider that is determined to possess a desired characteristic. Some example characteristics may include, an insurance amount, a rating by other customers, a rating by people in a social network (e.g., a social network of the customer, a social network of a merchant, etc.), a license to perform an action (e.g., a license to transport a particular good), location of agent, source, destination, etc., equipment required and/or desired to perform a service (e.g., a truck large enough to carry a good, a refrigerated vehicle for transportation of refrigerated goods), a desired bonding method fulfilled (e.g., social security number provided, address provided, money provided, insurance obtained, university ID provided, a background check performed, and so on), availability during a desired time, and/or any desired characteristic. In some embodiments, an originator of order information may submit such filtering characteristics (e.g., a customer submitting an order, a merchant that submits information about an order for delivery to a customer). In some embodiments, a default set of filtering criteria may be used.

As indicated at block 1005, some embodiments may include receiving the transmitted order information. Such information may be received by one or more delivery agents. Such information may be received, for example, by a program run by a delivery agent and displayed to the delivery agent through a user interface. Such information may be received by a delivery agent through a website or other such interface. In some embodiments, filtering ma take place at a receipt end. For example, in some embodiments received and/or transmitted information may indicate a desired characteristic and a receiving entity may determine if an associated entity meets such a characteristic before acting on the received information to initiate a possible bid.

In some embodiments, a delivery agent may determine a bid to be placed regarding the delivery of the order. Such a bid may include a cost for making the delivery. Such a bid may include a time and/or time frame for making the delivery. The time and/or time frame may match and/or not match the time and/or time frame associated with an order. Such a bid may be made based on an availability of a delivery agent. For example, if a delivery service has one of a group of deliverers available at a time, the delivery service may place a bid on making the delivery. A cost of the bid may be based on a cost of performing the service, such as distance traveled by the agent to perform the service, risk taken to perform the service, and so on. A time may be based on an availability of a delivery agent and/or a distance to travel for the order. A computer program may be configured to calculate such information and determine the bid and place the bid in response to receiving such information and/or information about other obligation of a delivery service. A delivery agent may refer to an individual and/or a plurality of agents working together. Some embodiments may include entering information about a bid in a user interface, through an API, and so on.

In some embodiments, a portion of a bid may be based on a location. In some embodiments, for example, a portion of a bid may be based on a location of a delivery agent and/or employee of a delivery service (e.g., an employee that may perform the delivery). For example, in some embodiments, a price for a bid may be based on a distance that an employee may need to travel from a current location to a merchant location and then to a user location to perform a delivery. As another example, a time and/or time frame may be based on a location. For example, a time may be based on a distance that an employee may need to travel from a current location to a merchant location and then to a user location.

In some embodiments, a price may be based on any desired characteristic of an order and/or service to be provided. For example, such a price may be based on a quantity of food items, a weight of items, a cost of items, a risk of providing delivery (e.g., risk of being late, danger of a neighborhood, risk of being caught in traffic, and so on). It should be recognized that although examples are given in which a bid is based on cost, location, and other characteristics that a bid may be based on anything as desired.

As indicated at block 1007, some embodiments may include receiving an indication of a bid for delivery of the order. Such an indication may be received by a device of a delivery agent. Such an indication may be received in response to receiving information about the order. Such a bid may include a cost of performing a delivery, a time for completion of the delivery, and so on.

As indicated at block 1009, some embodiments may include transmitting the bid. Such transmitting may be performed in response to receiving the indication of the bid. Such transmitting may include transmitting from a delivery agent. Such transmitting may include transmitting to a user, a merchant, a system 101, and so on.

As indicated at block 1011, some embodiments may include receiving a plurality of bids to make a delivery. Such bids may be received in response to transmissions of the bids. Such bids may be received from delivery agents. Such bids may be received through a website. Such bids may include information about costs, times and/or time frames, and so on.

It should be recognized that any number of bids may be received from any number of delivery agents and/or service providers, that any number of delivery agents and/or service providers may determine, receive, transmit bids in any manner as desired in any embodiment.

In some embodiments, one or more bids may include an indication of a price. Such a price may include a price to be paid to the delivery agent if the bid is accepted and the delivery is performed. Such a price may include a percentage of a referral fee, a percentage of a price for goods, a flat fee, and so on. For example, in some embodiments such a price may include a percentage (e.g., 25%) of a fee paid to a referral service for referral of an order to a merchant.

In some embodiments, one or more bids may include an indication of a time and/or time frame. Such a time and/or time frame may include a time and/or time frame that a delivery agent agreed to perform the delivery if the bid is accepted.

As indicated at block 1013, some embodiments may include selecting a delivery agent based on the plurality of bids. Such a selection may be performed at an end of a time period for bidding. Such a selection may be performed when a bid with a desired property is received. Such a selection may be performed in response to receiving one or more bids. Such a selection may be performed by a system 101, a user, a merchant, and so on. Such a selection may be based on a cost associated with the bid. For example, a lowest cost bid may be selected. Such a selection may be based on a reputation of delivery agent. For example, a bid from an agent with a better reputation may be selected over a bid from an agent with a lower reputation. Such a selection may be based on a time and/or time frame associated with a bid. For example, a bid with a time and/or time frame that most closely matches a time and/or time frame associated with an order may be selected. In some embodiments any desired property may be used to base a selection. In some embodiments any combination of properties may be used to select a delivery agent based on bids. For example, a formula that weighs various characteristics may be used to select a bid that results in the highest overall weight output by the formula when the various properties are input into the formula. Any method of determination may be used in any embodiment, including selection. Such selection may be based on one or more of the bids.

In some embodiments, bids associated with service providers that have and/or do not have one or more characteristics may be filtered out. Such filtered out bids may not be used to determine which service provider to select. For example, in some embodiments, bids from delivery agents that do not have a minimum rating, desired equipment, a desired bonding, and so on may be filtered out.

In some embodiments, such filtered out bids may be used nonetheless if no other bids are received, and/or if the other bids that are received are determined to be inadequate. For example, in some embodiments, if the other bids are too high, then the filtered out bids may be used (e.g., if they are 25% higher, 50% higher, 50$ higher, 10$ higher, and so on). As another example, if there are not enough other bids, then one or more of the filtered out bids may be used. In some embodiments, using the filtered out bids may include using the filtered out bids in an order based on price, in an order based on another characteristic, and so on. For example, in some embodiments if the filtered out bids are filtered out based on a lack of a characteristic (e.g., rating), then the bids with the closest characteristic to the desired characteristic may be used before other bids (e.g., filtered out bids with highest rating may be used before those with lowest rating). For example, if a 4 star rating is required, but no bids with 4 star ratings are received, then bids with 3 stars may be used instead.

In some embodiments, such selection may include selecting a lowest priced bid. For example such selecting may include determining that a price associated with a selected delivery agent is lower than one or more other bids. In some embodiments, such selection may include selecting a bid that matches a time and/or time frame associated with an order. For example, such a selection may include determining that a time and/or time frame associated with a selected delivery agent matches a time and/or time frame of an order. It should be recognized that such examples of selection are given as examples only and that any desired method may be used. For example, some embodiments may include using an algorithm that includes at least one of a time and/or time frame associated with an order, a time and/or time frame associated with one or more bids, and/or a price associated with one or more bids. For example, such an algorithm may include a formula. For example, such an algorithm may weigh time differences and cost to determine a lowest cost delivery agent that may deliver near a desired time.

As indicated at block 1015, some embodiments may include facilitating delivery using the selected delivery agent. Such an action may be performed in response to selecting the agent. Such an action may be performed by a merchant, a user, system 101, and so on. Facilitating delivery may include transmitting information about the delivery to the delivery agent, arranging payment, making a payment, and so on. Such information may include additional information to that transmitted to elicit a bid, such as order details, location information, and so on. Such facilitating may include transmitting a request to perform the delivery. A delivery service provider may receive such information and facilitate delivery, for example by performing the delivery, by notifying an employee, and so on.

It should be recognized that although various example are given in terms of determining a delivery agent after a single order is placed, that some embodiments may include determining a delivery agent before an order is placed and/or for more than one order. For example, an auction may be used for a next order, for orders in a time period in the future, for a next set of orders, for orders in a geographic area, for orders in a slice of time in the future, for orders on particular days, for orders in a month, for a series of orders, for a group of orders, and so on.

Interface Examples

FIG. 4A illustrates an example interface that an agent may use in some embodiments. In this example, the interface may be a delivery agent interface on a mobile device, but it should be recognized that any agent and any device type may be used as desired. Through the example interface of FIG. 4A, an agent may access a history of jobs, current jobs, possible jobs, other information desired, and so on.

FIG. 4B illustrates an example interface through which a delivery agent may access information about current jobs assigned to the delivery agent. For example, a user may view a list of jobs that are assigned to the user. Information such as time left to provide the service, the type of service to provide, the location for pickup and/or delivery, a current status of the job, and so on may be accessible through such an interface. A similar interface may be used to display possible jobs to a user rather than assigned jobs. For example, such an interface may display a list of possible jobs that a user may choose to accept (e.g., through abiding process). Such a list may be sorted (e.g., based on distance, time until bidding ends, time until service is to be performed, price, a user chosen criteria, a system chosen criteria, and so on).

FIG. 4C illustrates an example of an interface that may display one or more jobs. For example, the interface may show jobs in a map view. The jobs may include assigned jobs and/or available jobs (e.g., jobs that may be bid on). Other information may also be displayed in some embodiments. For example, in an embodiment in which a delivery service that operates numerous agents uses such an interface, the interface may show a dispatch agent the locations of delivery agents operated by the delivery service. In some embodiments, such an interface and/or the interface of FIG. 4B may allow such a delivery service to assign a delivery agent to a particular job. A delivery agent may be notified of such an assignment through a similar interface or other interface such as one of those shown herein by adding the job to a listing of assigned jobs for that agent in response to the dispatch agent assigning the job to the delivery agent.

The map interface of FIG. 4C may display locations of pickup and/or delivery (or wherever a service is to be provided) for jobs available or assigned to an agent. A user may click on a location for a job and be shown detailed information about the job such as exact location, type of job, path from pick up to delivery, a time for performing an action, bid amounts, and so on).

Figure 5A:
Figure 5B:
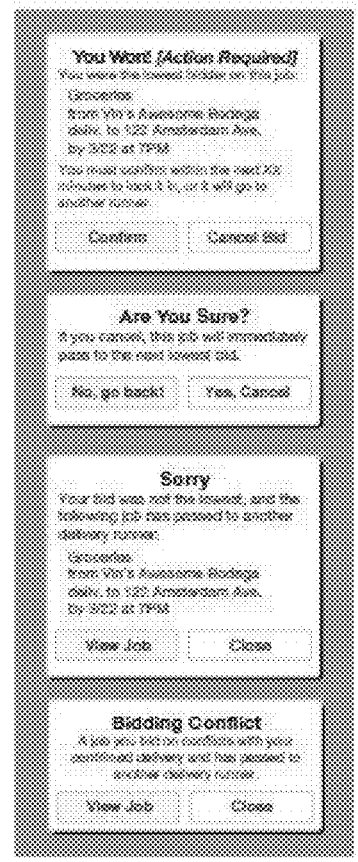

FIG. 5A illustrates an example interface that may be used to bid on a job by an agent. For example, the interface may display information about a possible job to a delivery agent (e.g., location, time, type, etc.). The agent may operate a control to enter information defining a bid and submit the bid to a service. FIG. 5B illustrates some example alerts that may be provided to a user through such an interface in response to bidding on a job. For example, a user may win an auction and be assigned the job (e.g., in response to a confirmation). A user may cancel a bid. A user may lose an auction (e.g., to a lower bidder). A user may be disqualified from a bid because a previously assigned job may be determined to conflict with a job on which the bid is placed. For example, if a user has already accepted another job that would require the user to be in a different location at the same time as the job on which the user is bidding, the user may be prevented from winning the auction and/or placing the bid for the job. In some embodiments, if a user wins an auction, bids for conflicting auctions may be canceled to prevent such a situation form occurring.

Figure 5C:
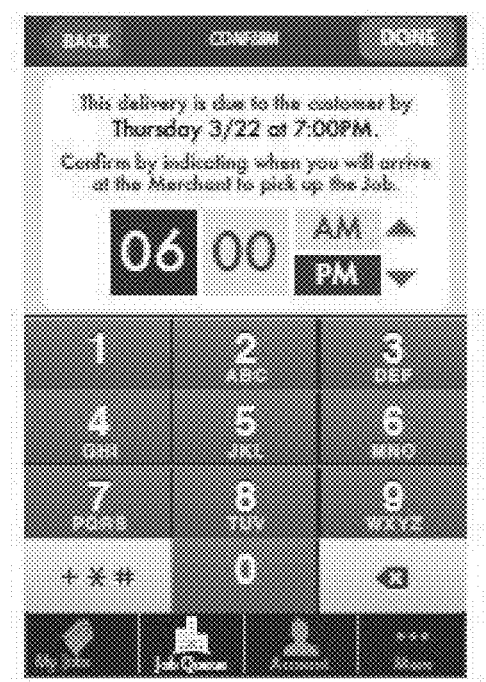

FIG. 5C illustrates an example interface through which a delivery agent that wins an auction may identify information to define the process of performing the delivery. For example, in some embodiments, to facilitate a smooth delivery process, the delivery agent may indicate an estimate time for pickup of the goods. A service may require that the pickup time be before a delivery time by some minimum amount (e.g., that may be based on distance of the delivery, traffic, etc.). A merchant may be required to accept the pickup time (e.g., the merchant may be sent the information and asked to confirm that the pickup time is acceptable). Accordingly, through a service and interfaces displayed through computing devices, the merchant and delivery agent may agree to times for a pickup such that the merchant can prepare the goods and the delivery agent can pick up and deliver the goods by the time the user expects to receive the goods. It should be recognized that there may be any number of agents involved in such a process such as pickers, packers, delivery agents, and so on.

Figure 5D:
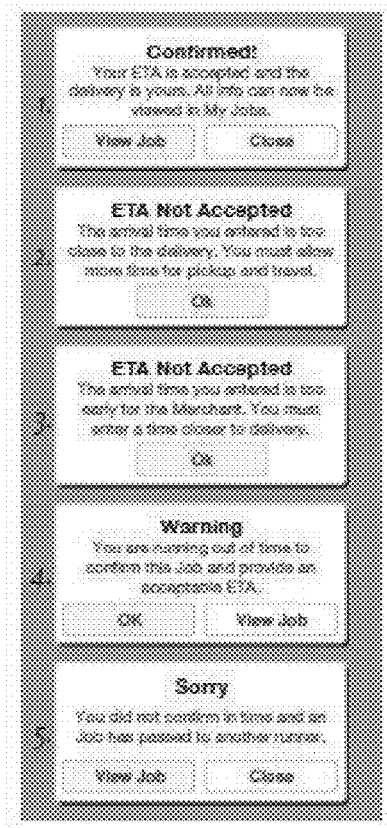

FIG. 5D illustrates some example alerts that may be presented to a delivery agent in response to entering information to establish a delivery. For example, a pickup time may be accepted. A pickup time may be rejected and a new one may be required because the time is too late. A pick up time may be rejected and a new on required because the time may be too early. A user may be alerted if they do not enter the time for a pickup within some period of time (e.g., 5 minutes, 10 minutes, 25% of the delivery time, etc.). If the user does not respond to such an alert, the job may be pulled from the user and assigned to a different agent.

FIG. 6A illustrates an example interface that shows an agent detailed information about a particular job that the agent has been assigned and desires to run. For example, the interface may display location information, type information, names of locations, time information, direction information, and so on. Such information may allow a delivery agent to reach destinations for delivery.

FIG. 6B illustrates an example interface that may allow an agent to enter information about a delivery being processed by the agent. For example, as illustrated, the interface may display a listing of products that are to be picked up by the agent. The agent may operate a control (e.g., a checkbox) to identify that the product is in fact included in a pickup being performed by the agent from a merchant. The interface may include an option for an agent to report a problem with one or more items. For example, the agent may include that an item is missing, that an item is broken, that a quantity is incorrect and so on. Such information may be reported to a service and/or to a user expecting delivery. A service may begin a customer service process in response to determining that something is wrong with a delivery. For example, the service may refund some money to the user, the service may arrange for the products to be delivered in some other way, the service may notify the user, and so on.

FIG. 6C illustrates an example authentication interface that may be used in some embodiments. Such an interface may allow responsibility for an order to transfer from person to person. For example, such an interface may include an interface that captures initials (e.g., a merchant may initial the interface to indicate transfer from the merchant to the agent and a customer may initial the interface to indicate transfer from the agent to the customer). It should be recognized that various forms of authentication may be used, such as near field communication, pictures, initials, and so on.

It should be recognized that the various example interfaces are given as non-limiting examples only. Other embodiments may include any desired set of interfaces presented to any desired users in any manner.

Ecommerce Add-on Examples

Some embodiments may include an interface with an ecommerce site. For example, in some implementations, an ecommerce website may include a checkout process. As part of the checkout process, a user may be asked to select a delivery method. In some embodiments, a plurality of delivery options may be presented (e.g., FedEx, ups, next day, standard, etc.). In some embodiments, a service may provide all delivery using a set of delivery agents. In some embodiments, the service may be an option among other options (e.g., to provide same day delivery services using a set of delivery agents that may bid upon the delivery of the goods). In some embodiments, the price of using the service rather than standard options may be set (e.g., the price may be s asset price regardless of an auction process result) In some embodiments, the price may be based on a cost of a backup delivery agent that has agreed to perform all deliveries if no cheaper option becomes available through an auction process. In some embodiments the price may be based on the outcome of a bidding process such that the user may not know the actual price until the auction is completed. The user may be shown a maximum price that may be based on a backup provider price.

Some embodiments may include a communication between a service for providing such delivery services and an ecommerce site. For example, the ecommerce site may access an API of such a service to access information and communicate information to the delivery service. For example, to populate a checkout page with delivery details (e.g., cost, time), the ecommerce site may query an API to get a current price for performing the delivery. As another example, to initiate a delivery, the ecommerce site may transmit information to the service identifying the delivery. As another example, if the price of the delivery changes because a bidding process has reduced the price, the API may be used to transmit information to the ecommerce site identifying the final price. Such a final price may be used to charge the customer an accurate amount. In response to receiving information from the ecommerce site, the service may initiate a bidding process and other action to facilitate the delivery of an order to the customer.

It should be recognized that any form of interaction between a delivery service and an ecommerce site may be used to enable the ecommerce site to include use of the delivery service as a delivery option in a checkout process and to initiate a delivery in response to a user selecting such a service as a delivery provider.

Suggestion Examples

Some embodiments may include making a suggestion based on locations (e.g., presenting information through a user interface). Such a suggestion may be made in response to an order from a first merchant being placed and/or received. Such a suggestion may include a suggestion related to a second merchant. Such a suggestion related to a second merchant that is proximate to a location and/or route related to the first merchant and/or the customer (e.g., close to the first merchant, close to a route between the first merchant and the customer, close to the customer). Some embodiments may include determining that a second merchant is close to a location and/or route (e.g., within a threshold expected time frame, within a distance threshold). In some embodiments, making a suggestion may be performed in response to such a determination.

Some embodiments may include suggesting a merchant and/or goods to a customer. Such a suggestion may be made by a delivery/referral system, by a delivery agent, by a merchant, and so on. Such a suggestion may be made through an interface (e.g., a webpage) that may be used to place an order. In some embodiments, such a suggestion may include a suggestion based on a location (e.g., a location of a merchant, a location of a destination, a location of a service providing agent, a route between one location and another location). For example, some embodiments may include making a suggestion of a merchant and/or good sold by a merchant that is near the merchant for which an order is placed, a merchant that is along a route between the merchant for which an order is placed and a customer, a merchant within a threshold distance from a route between a merchant and a destination, a merchant that is along a route and/or within a threshold distance from a route between a service providing agent and a merchant (e.g., a picker, a deliver agent, a recipient agent, and so on), and so on. In some embodiments, such a suggestion may be based on ordered items and/or user profiles (e.g., a knowledge that a last time an order was placed a second order was also placed, a knowledge that a prior order may have been used such as an order of tissue paper, a knowledge that a favored merchant is near a route, and so on).

Some embodiments may include suggesting to a service provider. Such suggestion may include a suggestion based on a location ((e.g., a location of a merchant that the agent is performing a service with respect to, a location of a destination that the agent is performing a service with respect to, a location of a service providing agent, a route between one location and another location). For example, if a delivery agent is making a delivery from a first location to second location, a suggestion may be made that the merchant also make a delivery from a third location that is along the route from the first location to the second location to a fourth location (e.g., one that may be near the second location). Such a suggestion may include identifying an auction that is taking place with respect to a particular service. Some embodiments may include determining one or more locations and/or distances of merchant(s), customer(s), route(s), delivery agent(s), and so on such as by using one or more mapping techniques and/or received location information as discussed herein. Some embodiments may include determining that a suggestion should be made based on such one or more locations and/or distances (e.g., based on a distance being below a threshold, based on an expected additional time being below a threshold, and so on).

Some embodiments may include one or more computer systems that may process location information and/or perform one or more actions based on location information. For example, a delivery/referral service may receive information about locations of one or more agents, source information for one or more orders, destination information for one or more orders, routes for one or more deliveries and/or other services, and so on. In some embodiments, such a system may determine a route based on a beginning and ending location (e.g., using a mapping technique, using an outside source such as Google maps, and so on). In some embodiments, locations may be determined based on gps or other location information in a database (e.g., a location of a merchant may be determined based on location information for the merchant stored in the database). In some embodiments, locations may be determined based on location information received about an agent and/or destination (e.g., a gps location of a cab, an address for a delivery). In some embodiments locations may be compared to one another and/or to routes to determine a distance and/or expected time. In some embodiments, a suggestion, assignment, etc. may be facilitated (e.g., information may be transmitted) based on such a comparison (e.g., if the comparison is less than a threshold such as 1 mile). In some embodiments, records regarding distances and/or times may be recorded and used in the future to determine expected times (e.g., through a lookup table of past times between locations).

In some embodiments, a referral/delivery service may provide a payment and/or determine a payment to a merchant, delivery agent, and/or other entity that makes a suggestion in response to a customer and/or service agent accepting the suggestion. In some embodiments, a delivery agent may accept a suggested route at a discounted price because the route does not add much time and/or expense to a delivery. Similar acceptance may be made for any service provider (e.g., a picker that is already at a store for another order). In some embodiments in which cost of service providing is passed on to a customer or merchant, an allocation of the cost of the two routes (e.g., or more routes as desired) may be made between the two routes based on the cost of both routes. For example, the cost may be reduced for the first route and increased for the second route such that the second route is not blessed with a lower fee because it was accepted second. In some embodiments, the cost may not be passed along to the costumer or merchant, so that the referral/delivery service may take the lowering in price as part of a payment.

Example Instaship System

FIG. 7 illustrates an example system that may be used to facilitate delivery services for one or more merchants to one or more customers. Such deliveries may be high speed (e.g., same day deliveries) that present significant logical hurdles when compared to traditional low speed delivery. Such a system may be used by merchants, customers, delivery agents, and/or other users to arrange for same day delivery of one or more physical goods from one or more merchants using one or more delivery agents to one or more customers. The illustrated example system should be understood as a non-limiting example only. Other embodiments may include more, fewer, different, consolidated, none, differently arranged, and so on elements. For example, some embodiments may include point of sale integration systems, a delivery service app/web page for customer purchasing through an aggregator site, a mobile functionality component, tracking elements, an inventory tracking component, auditing elements, taxing elements, revenue/billing elements, and so on.

The illustrated example shows an in-store customer 701 using a delivery/referral service; a web customer 703 using a delivery/referral service; an independent delivery agent (or a delivery agent that is not associated with a third party dispatching software) 705 providing delivery services, and a confederated deliver agent (or a delivery agent that is associated with a third party dispatching software) 707. The illustrated example shows such actors interacting with third party elements such as a merchant web page/webserver 709, a merchant mobile application/mobile website/mobile web server 711, a third party dispatching software 713, a third party carrier application 715. The illustrated example shows a system for a delivery/referral service 717 interacting with actors and/or third party elements. The illustrated example shows that such a system may include an instaship API 719, a routing/logic database 721, a dispatching portal 723, an instaship carrier application 725, and a public website/web server 727. In some embodiments, various components may include electronic devices such as servers, blades, smartphones, tablets, laptops, and so on. Actors may interact with one or more computing devices through API's and/or GUIs in some embodiments. Computing devices may interact with one another through electronic transmissions such as through APIs over the internet or other networks in some embodiments. Again, these components, arrangement of components, interaction of components, actors, and so on are given as non-limiting examples only.

It should be recognized that the illustration of FIG. 7 may include logical and/or physical components. For example, a third party carrier application 715 may be considered a software component and/or a computing device on which the application is run. Each such component may similarly represent a function being performed and/or a computing device performing the function. It should be recognized that the example of either logical or physical elements is non-limiting in either form. For example, an instaship API and a routing/logic database may be a same physical component, may be different physical components, and/or may not exist as either physical or logical component in some embodiments.

In-store customer 701 may include a customer of a merchant that uses a delivery/referral service. Customer 701 may include a customer in a physical brick and mortar store location of the merchant. The merchant may include a merchant that has one or more physical stores and/or one or more virtual stores (e.g., web pages). For example, one example merchant may include Target. Customer 701 may shop for items in the store in a conventional manner. Upon checking out of the store the merchant may indicate (e.g., to a self-checkout kiosk and/or to a cashier) that the customer desires delivery of purchased goods. A cashier for example may use an interface of a point of sale terminal and/or an interface of another device such as a tablet or smartphone to access an interface that may be used to identify delivery parameters to a delivery/referral service.

Merchant mobile application/mobile website/mobile web server 711 may provide the interface for a user to engage in a delivery of an in store purchase. For example, an element running on a self-checkout kiosk, a cashier's point of sale terminal, and/or another device may allow entry of information to indicate that a particular order is designated for delivery (e.g. high speed delivery, same day delivery) and to begin a delivery process for the order. Information such as an order number, an insurance of order, a cost of delivery, a payment method for delivery, a delivery destination, a delivery source, and/or other information may be communicated between a merchant mobile application/mobile website/mobile web server and a delivery service (e.g., through an instaship API 719). For example, a customer and/or a cashier may enter an order number and an order destination into a computer interface. That information may be transmitted along with a merchant identifier to a delivery/referral service in a format/manner recognized by the delivery/referral service. The delivery/referral service may use that information to facilitate delivery and/or bill a merchant or customer for that delivery.

A point of sale terminal may, in some embodiments such as where a merchant does not pay for delivery, cause a charge for delivery to be added to a customer bill. The merchant mobile application/mobile website/mobile web server 711 may communicate that cost to a point of sale terminal based on a flat rate, based on a rate received from the delivery/referral service, and/or in any other manner. In some embodiments, a cashier may receive a rate through an interface of a computing device and/or may otherwise determine a delivery rate and may enter that rate into a point of sale terminal. In other embodiments, a point of sale terminal and delivery interface may not have such interaction regarding rates but rather a separate payment may be billed for delivery services to the merchant and/or to the customer. For example, a tablet using the Square payment system may be situated near a point of sale terminal and may be used to make a payment and arrange for delivery.

As another example, a merchant mobile application/mobile website/mobile web server 711 may include an application running on a customer 701's device. For example, such a device may allow a customer to scan UPC codes on items in a store to create a virtual shopping cart of goods. Rather than and/or in addition to actually arranging for purchase and/or delivery by bringing goods to a point of sale location a user may fill such a virtual shopping cart to make a purchase and/or arrange for delivery. In some embodiments, a customer may enter payment and make the sale through the device. In some embodiments, a customer may bring the mobile device (along with possible physical items picked up) to a point of sale terminal to make the purchase and/or arrange delivery. For example, a mobile device and point of sale terminal may communicate (e.g., through Bluetooth, Wi-Fi, QR code scan, etc.) to communicate a virtual shopping cart to the point of sale terminal. Sale and delivery may be processed as described elsewhere with a picker and/or packer used to pick and/or pack a virtual shopping cart into a physical order for delivery.

Web customer 703 may include a customer that access a website of a merchant. The merchant may be a same or different merchant as the merchant discussed with respect to in-store customer 701. For example, one customer may shop at a brick and mortar Best Buy while another customer shops at Bestbuy.com. Web customer 703 may build a web shopping cart filled with items by surfing a merchant's web page/web server 709. Upon checkout, a merchant's webpage may communicate with a delivery/referral service to determine if a delivery service is available to deliver the web customer's order. For example, the merchant web server may transmit order pickup location and delivery location to the delivery/referral service. In response, the delivery/referral service may determine whether a same day delivery of the order is possible and/or determine the cost of such an option. The delivery/referral service may transmit availability and/or cost information back to the merchant web page/webserver. At least some of that information may be presented to the web customer 703 through a checkout interface allowing the customer to select same day delivery when it is available. The merchant may determine the delivery charge based on the cost identified by the delivery service and/or in any manner seen fit by the merchant. If the customer selects such an option the customer may facilitate payment to the merchant (payment may include a fee for delivery and/or a merchant may offer a discounted and/or free delivery.) The merchant web page/web server may communicate information to the delivery/referral service indicating that delivery should be made for the order (e.g. source, destination, order number, acceptance of communicated cost, insurance information, ordered items, timing of delivery, customer name, etc.). In response to receiving that information, the delivery/referral service may facilitate delivery as requested by the web customer.

It should be recognized that any number of merchants and/or any number of customers in any combination of web and/or in store may use a delivery and/or referral service. The illustrated example is merely a non-limiting example that illustrates some example functionality of some embodiments.

Delivery agent 705 may include an independent delivery agent. Such an agent may use an instaship carrier application 725 on his or her computing device to interact with a delivery/referral service. Various example of interaction that may be used between a referral and/or delivery service and an independent delivery agent using an instaship carrier application are given elsewhere, for example in FIGS. 4-6 and/or associated discussions. An independent delivery agent may include a user that meets any qualifications (e.g., installed an application on a smart phone and created an account, became bonded and/or insured to make deliveries, etc.). The qualifications may be specific to an order (e.g., has a type of vehicle, has certain certification to make hazardous deliveries, is bonded to a certain amount, is of a certain age, etc.). A delivery/referral service may determine that the delivery agent has such qualifications before allowing the delivery agent to make a delivery.

In some embodiments, an independent delivery agent 705 may receive information through an instaship carrier application 725 identifying a delivery job. (e.g., pickup location, destination, etc.). In some embodiments, a delivery/referral service may assign jobs to a set of delivery agents that may include an independent delivery agent 705. An independent delivery agent 705 may accept a job assigned to him or her and/or reject a job assigned to him or her by a delivery/referral service. If the agent accepts the job, the agent may be assigned the job by the delivery/referral service. The agent may make delivery of the job and be paid for that delivery (e.g., by the delivery/referral service, by the customer, by the merchant). Some embodiments, as discussed elsewhere, may include a bidding mechanism for the independent delivery agent to bid on a delivery job. A delivery/referral service may receive bids for a job and/or compare bids to a prearranged rate for delivery to determine which agent of a plurality of agents should make a delivery. In some embodiments, a delivery agent may establish an auto-bid with one or more parameters (e.g., x amount per mile, y amount per item, z amount per pound, etc.). If the delivery agent 705 is determined to be the agent for making the delivery, the agent may be assigned the delivery job and/or paid for completing the delivery job. The delivery agent may be tracked, may pick up goods, may drop off goods, and/or may perform any actions or allow any actions to occur that may facilitate delivery of goods to the customer. The instaship carrier application may interact with a dispatching portal to make determination of assigning delivery agents for a delivery job.

Confederated delivery agent 707 may include a delivery agent that works for a delivery company that uses a third party dispatching software to control a fleet of delivery agents. For example, such a delivery agent 707 may include an employee of a taxi service, an employee of a courier service, and so on. Confederated delivery agent 707 may accept delivery jobs communicated to him or her through a third party carrier application 715 and/or in any manner in which a confederated delivery service assigns delivery jobs to its workforce (e.g., radio dispatch). A third party carrier application may operate similarly and/or differently from an instaship carrier application. For example, in some embodiments, a confederated delivery agent may not bid on jobs but rather a dispatching service may bid and/or arrange for a cost of delivery. As another example, in some embodiments, a confederated delivery agent may not be allowed to reject or otherwise not confirm delivery jobs if the confederated delivery service accepts a delivery job and assigns it to the agent as part of an employment arrangement with the confederated delivery service.

In some embodiments, a delivery/referral service may identify information about delivery jobs to a confederated delivery service by communicating with a third part dispatching software 713. A dispatching portal 723 of a delivery/referral service may integrate with a third party dispatching software to add, assign, manage, view availability, and so on for delivery jobs for the confederated delivery service. Based on information received from a delivery/referral service, a third part dispatching software may communicate delivery jobs to a confederated delivery agent 707 though a third party carrier application 715 run on a device of the delivery agent 707

For example, in some embodiments, a referral/delivery service may have an agreement with a confederated delivery service that the delivery service will provide same day/high speed delivery services in certain regions during certain times for a set price. The delivery/referral service may determine that that price is better than other bids received for a job and in response my assign the confederated delivery service a delivery job by writing the job into a delivery job blotter of a third party dispatching software that controls the dispatching of the confederated delivery service. In response to such a write, the confederated delivery service may arrange for the delivery agent 707 to facilitate a delivery of an order.

It should be recognized that interaction between confederated delivery services and a delivery/referral service and interactions between an independent delivery agent and a delivery/referral service are given as examples only. Various methods of interaction between agents whether confederated or independent may be used in various embodiment. For example phone calls, radio dispatches, faxes, emails may be used in various embodiments to arrange for delivery and/or to confirm acceptance of delivery jobs.

It should be recognized that any number of confederated and/or independent delivery agents may be used in various embodiments to fulfill any number or arrangement of delivery jobs from any number of merchants to any number of customers. In some embodiments multiple agents whether confederated or independent may even operate together to fulfill a delivery job (e.g., from multiple sources to a single destination, from multiple destinations to a single source, to fulfill large orders that would not be serviceable by a single agent, etc.). A delivery/referral service may use any number of various confederated delivery services in any manner. For example, a delivery/referral service may have deals with a Manhattan bike currier service, a Brooklyn based taxi dispatch service, and an all New York City delivery company. Each such service may operate at certain hours, in certain locations, for certain prices. A delivery/referral service may manage those restrictions to determine which if any of these services to use for a particular delivery.

Delivery/referral service 717 may receive information requesting same day delivery of an order, may price delivery service, may facilitate delivery of the order. The delivery/referral service may provide any delivery related service that may be desired such as tracking, auditing, billing, insuring and/or so on.

Intsaship API 719 may be configured to receive information from outside sources such as merchant webpage/server 709 and/or merchant application/mobile site/server 711. Instaship API 719, for example, may receive information such as delivery source, order number, delivery destination and/or other information that may be used to facilitate delivery provision, delivery pricing, and/or delivery availability checking. Instaship API 719 may communicate information about a delivery to outside sources. For example delivery API 719 may communicate delivery availability, delivery pricing, and/or delivery confirmation from a delivery/referral service to a merchant website, a merchant application/mobile site/server, etc. A merchant website for example may use a delivery pricing received from an instaship API to display a same day delivery option on a checkout screen of a web page. In some embodiments, a same day delivery option may not be available for an order and such information may also be communicated and used to generate a checkout interface that does not include a same day delivery option.

A routing logic/database 721 may be used to determine available delivery options, track delivery jobs, and/or otherwise facilitate delivery provision, pricing, and/or availability checking. For example, in some embodiments, such a component may determine a set of available delivery agents for a particular delivery in response to a delivery/referral service receiving information about a delivery job through an instaship API.

Such information may be determined based on deals with confederated delivery services and/or interaction with a third party dispatching software to determine whether a confederated delivery service has available agents. For example, in some embodiments, a delivery/referral service may have deals with a plurality of confederated delivery services that each include a time frame and/or location for delivery. In response to receiving information about a delivery job, a delivery/referral service may sort through such information to determine if any deals cover the delivery job (e.g., if any deals are for a current time and/or geographic area that covers a source and/or destination of a delivery job).

Such information may be determined based on available independent delivery agents (e.g., agents that are currently signed into an instaship carrier application and/or set as available in such an application, and/or in a geographic area that is within a threshold distance of a source of a delivery job).

In some embodiments, a delivery/referral service may determine how to communicate with available delivery agents to determine an agent to use for a delivery job. For example, a determination may be made that a delivery agent is not using a third party dispatching software and in response interacting with the agent through an instaship application.

In some embodiments, if no confederated delivery agent has a deal to deliver for a time and/or area, a delivery/referral service may report same day delivery as unavailable even if an independent agent may be available if a bidding process is used. In other embodiments, a delivery/referral service may attempt to find an independent delivery agent even if no confederated delivery agent is available for a particular delivery job thereby minimizing the number of times high speed delivery is unavailable.

In response to determining the set of possible delivery agents, a delivery/referral service may determine which one or more of the agents to use to make a delivery. For example, in some embodiments, a delivery/referral service may reference a price agreed to by each confederated delivery service that is available for the delivery job to determine a cheapest option. In some embodiments, the delivery/referral service may initiate a bidding through independent and/or confederated delivery services. If a bidding process results in a cheaper rate than an otherwise agreed to rate then an agent that made such a lower bid may be chosen for a delivery job. Some examples of bidding functionality is provided elsewhere herein.

In some embodiments, such a process may be used to determine availability and/or pricing of a same day delivery service on demand in response to receiving delivery request information through an instaship API. In some embodiments, information resulting from such a process may be reported back through the API to a requester of same-day delivery services.

In some embodiments, such a process may take too long for some customers. For example, a bidding process may take minutes or more to complete. That may be more time than a customer may be willing to wait to determine a delivery provider. In some embodiments, to accommodate such time constraints, a delivery/referral service may be configured to use a faster paced bidding process in which bidders may be required to use an auto-bid to take part in a bidding process (e.g., set a minimum price thy are willing to bid for deliveries with various parameters such as distance time, weight, etc.) and/or a bidder must respond within a minimal amount of time. An auto bid may be set with a routing/logic database so that the routing/logic database may determine what bids might have been received without actually receiving individual bids though a manual process. A lowest auto bid amount may be determined and set as a winning bid.

As another example of accommodating this time constraint, some embodiments may use a lowest priced deal with a confederated delivery agent for a pricing and/or availability reporting. If a lower price is found through a bidding process, in some embodiments, a customer and/or merchant may be passed along the savings and billed less and/or returned an overcharge at a future time. In some embodiments, a delivery/referral service may keep a difference in cost as a payment if a lower price than charged is found.

In some embodiments same day delivery may be confirmed with an agent and then with a customer. An agent may be given some limited time to confirm the delivery. If the agent does not confirm the delivery a next best (next lowest priced bid) candidate may be used and given a chance to confirm delivery. Confirm delivery with agent, then confirm delivery with customer. In some embodiments confederated delivery services may not use a confirmation process (e.g., they may be required to make all deliveries that meet criteria) and/or confirmation may happen in near real time though an interface with a third party dispatching software that can quickly confirm availability by tracking all orders and agents run by a confederated delivery service. In response to a confirmation from an agent and/or a determination that a confirmation is not needed, information may be presented to a customer about pricing if the confirmation is made before a same day delivery is chosen and/or identifying that same day delivery is confirmed if the confirmation is received after the confirmation is received. In some embodiments, for example, a customer may be mailed a confirmation of same day delivery in response to a confirmation. In some embodiments, a price may be populated into a merchant website response to a confirmation.

If confirmation is never determined and no agent is available to fulfil an order, a delivery may be canceled or delivery to a later time and/or a delivery option for same day service may not be presented. For example, in some embodiments, if an order has already been placed and delivery options chosen but no agent can confirm for delivery of the order, then the delivery may be canceled or delayed to a later time. As another example, in some embodiments, if an order is not yet placed and/or same day delivery is not yet chosen and no confirmation can be found, then a same day delay option may not be presented through a delivery selection interface.

In some embodiments, delivery may be chosen by a customer and then a confirmation may be made with a delivery agent. In some embodiments, a confederated agent may be there as a backup if another other chosen agent does not confirm a delivery after having been selected for a delivery. A charge for a delivery may be set at a confederated delivery agent rate up front in some such embodiments so that a delivery/referral service does not end up stuck with a higher rate than charged. In other embodiments, a merchant may agree to cover and change in delivery costs and a customer may be charged a lower fee up front, but the difference later may be charged to the merchant (e.g., in a consolidated bill). In still another embodiment, the customer may be charged the difference in delivery charges at a later time to make up for the lack of confirmation, As still another example, in some embodiments, a delivery agent that does not confirm a delivery after his or her bid is used to set a price may be charge a difference in cost for pricing the delivery though a backup confederated or other option. It should be recognized that a variety of options for dealing with a change to confirmed delivery agents resulting in a change to a delivery price may be used and that the examples herein are non-limiting.

An instaship API may receive any more delivery information that might not have been received earlier. For example all items, customer name, exact addresses, etc. that might not have been received to make an availability and/or pricing check may be received. A dispatching portal may send delivery information that is needed to make a delivery to a chosen delivery agent if it was not sent during a bidding process or otherwise to the delivery agent selected previously.

Some embodiments may allow tracking to occur through public website 727 so that a customer can see real time location of delivery agents and/or what part of a delivery process a delivery job is in. Such a service may be accessed through a direct website with a delivery/referral service and/or made available through an API to include in third party websites (e.g. merchant websites). Such service may be facilitated through tracking gps location, tracking confirmation entered into carrier applications, receiving information from third party dispatching software, and so on.

In some embodiments, a billing module may track orders received for a merchant from a variety of customers over a time frame (e.g., a day, a month, a week, a year). The merchant may be billed for those deliveries over that time at the end of that period (e.g., monthly invoicing). The merchant may have collected delivery charges from customers and may use those fees to pay the monthly bill. The monthly bill may reflect an additional charge than the agents charge as a payment for the service. The bill may reflect only the deals with confederated delivery services and savings from independent delivery agents may be kept as a payment to the delivery/referral service. The bill may reflect actual agent costs. It should be recognized that the exact arrangement of revenue generation and/or allocation may vary from embodiment to embodiment and that the given examples are non-limiting. Such billing information may be generated by a delivery/referral service and/or transmitted by such a service (e.g., to a billing system or department of a merchant). In still other embodiments, delivery payments may be made directly to delivery/referrals service and/or directly to delivery agents rather than through merchants. A variety of merchants that use a delivery/referral service may be billed for their periodic and/or near periodic use of delivery services in such a manner. Some merchants may choose an on demand billing rather than such a consolidated billing in some embodiments so that each order has a delivery bill paid to the delivery/referral service directly.

In some embodiments components of a delivery/referral service may communicate with one another. For example, electronic communication may allow an API to pass information to a database and/or portal. As another example, electronic communication may allow information to be passed from a delivery agent to a database and a public website. One or more communication networks may connect such components and allow communication to occur.

In some embodiments, a delivery/referral service may offer insurance for a delivery to customers through a merchant web page/server 709 and/or merchant application/mobile site/server 711. Insurance may be based on a delivery agent rating, a cost of items, bonding of a delivery agent, distance of a delivery and/or any desired parameters. Such an option may be presented through a computer interface that allows a customer to purchase an insurance from the delivery/referral service such as a merchant web page. For example, an API 719 may communicate insurance information to a merchant interface along with delivery information to fill in an interface with information available for insurance and same day delivery. Such insurance purchase may actually be made through the merchant similar to some examples of a purchase of delivery services and accounting may be made later, for example, in a consolidate bill along with delivery services. In other embodiments such a payment may be made directly with a delivery/referral service.

Some embodiments may include a timing of a delivery. For example, in some embodiments a customer may choose a time for a delivery to be made. A delivery/referral service may communicate available times to a merchant interface for selection by a customer. Each time may have a different price associated with different available delivery agent options. A longer time frame may have different prices than narrow delivery windows based on available delivery agent options. Accordingly, a customer may have multiple choices of a same day delivery option. Other embodiments may not include such a timing option but rather may limit delivery to a same day and/or to some time period from order entry (e.g., within 24 hours, within 12 hours, etc.). A same day may turn over at some point that is or is not midnight. For example, in some embodiments, orders received after 5 pm, after noon, after 8 pm, after 11 pm, and/or any other desired threshold may not be eligible for same day delivery and/or may be treated as a next day. In some embodiments, orders delivered within 12 hours may be used as a threshold for delivery timing rather than a same day delivery. Such 12 hour delivery may be offered if an order is received after some threshold time win which same day delivery may not be offered.

In some embodiments initial information communicated about a new order to determine pricing and/or availability of delivery may include source and/or destination location. Such information may be given exactly and/or in zip code or other approximate way. Other information in some embodiments may include delivery restrictions (e.g., driver must be of age to deliver alcohol, hazardous material certification required, oversize vehicle needed, etc.), list of items, cost of items, distance for delivery, name of merchant, order number, name of customer, credit card information, latest time of delivery, time frame for delivery, and so on. Some information such as some of this listed information may be received later, such as in response to a customer choosing a same day delivery. For example, in some embodiments, name, credit card, exact address, exact items, and so on may be withheld until an option of same day delivery is chosen for an order.

It should be recognized that while some embodiments of a delivery/referral service are given in terms of a same day delivery option that such examples are given as non-limiting examples, Various embodiments may include any of a variety of high speed delivery options (e.g., 1 hour, half hour, 2 hour, 5 hour, 10 hour, 12 hour 24, hour, etc.). A high speed delivery option may include options for delivery within a day of receiving an order. Such delivery options present more difficult logistical problems than low speed delivery options such as traditional USP, USPS, and/or FedEx type services offer.

In one example, an in store customer may select a high speed delivery option. A delivery/referral service may receive information identifying the source and destination of the order. A price and an availability of the order may be determined in response to receiving the information. An independent agent may be determined to be available and to be used for the delivery at a price based on the independent agent having a lowest auto bidding price and that price being lower than any set deal prices with confederated delivery services based on a review of information in a routing/logic database. The price and availability may be transmitted to the merchant application for display to the customer. The customer may agree to the price and finalize the order and payment for the order. Information identifying the finalization and other details of the order may be sent other delivery/referral service through the API. In response, delivery may be confirmed with the selected delivery agent through an instaship carrier application. A response to confirming the delivery, a confirmation may be sent to the customer and delivery may be facilitated from the merchant to the customer using the selected independent delivery agent.

In another example, a website customer may reach a virtual checkout screen. A webserver may communicate through the API to determine availability of same day delivery options by transmitted source and destination information to the delivery/referral service. The routing/logic database may be queried to determine that a confederated delivery service is available and the price to use that agent based on that service being the lowest priced confederated delivery service that has a deal with the delivery/referral service. A check may be made through a third party dispatching software to verify that the service is in fact available. In response to either and/or both of a price being determined and an availability being verified the availability and pricing information may be transmitted to the merchant web server for inclusion in the virtual checkout process. In response to receiving an order finalization from the web server, a bidding process may be used to determine an actual delivery agent to be used. A determination may be made that no delivery agent (e.g. no independent delivery agent) has a lower price for the delivery and so the chosen confederated delivery service may be used in response. Information may be sent to the confederated delivery agent through a third pat dispatching software to facilitate the delivery to the customer form the merchant using the chosen confederated delivery service.

Some embodiments may include billing a merchant for both such deliveries together in a consolidated bill for a time period over which the deliveries occurred. Some embodiments may include inventory and/or point of sale interaction with merchant systems.

Again, it should be recognized that various examples given herein are non-limiting, they are given to illustrate a variety of possible features that may or may not be present in a variety of embodiments. For example, the examples above may have different operating procedures but may happen in a single embodiments, and/or may occur in separate embodiments. Other embodiments may include other operating procedures that may or may not have been explicitly described in an example. Some or all elements of each of the two examples may be combined and/or arranged in any manner desired with or without other elements from other embodiments.

Example Billing

FIG. 8 illustrates an example method that may be used in some embodiments to facilitate merchant billing for delivery jobs. Such delivery jobs may include high speed delivery jobs. In some embodiments, a delivery/referral service may maintain a record of delivery services used through a delivery/referral service from a merchant to customers during some period of time and/or with some parameters. At the end of the period of time and/or as otherwise desired, the delivery/referral service may bill the merchant for those delivery services. Accordingly, a merchant may utilize delivery services over an operating period and then settle for those services at a convenient time.

FIG. 8 illustrates an example method that may be performed by a delivery/referral service (e.g., a billing server and/or one or more other computing devices thereof) to provide billing services in some embodiments. It should be recognized that such a method is given as a non-limiting example only and that various embodiments may include differently ordered actions, more actions, fewer action, no such actions, and so on. It should also be recognized that while some embodiments are given in terms of periodicity that other embodiments may include near periodic, occasional, random, and/or any form of consolidated billing that is desired. Periodic may include a day or so off from a true period (e.g., billing on a Monday when a period ends on a Sunday, etc.). Some bills may have one or more delivery jobs that occurred in a period missing for various reasons (e.g., processing delay, etc.) and still be considered a bill for a period.

In some embodiments, web customers and in store customers may be treated similarly. For example, a single bill for web customer and customers at brick and mortar stores for a merchant that maintains both a physical and virtual presence may be determined. In some embodiments, web customers may be treated separately from in store customers. For example, each store location may be billed separately from one another. In some embodiments, each brick and mortar location may have a bill determined separately. In some embodiment a set of stores may be combined together (e.g., those owned by a single person). A virtual web presence may be billed separately from physical stores in such an embodiment and/or in a set of some but not all (e.g., those owned by a corporate entity may be billed with a web presence but separately from franchised locations).

As indicated in FIG. 8, some embodiments may include opening an account for a merchant with a delivery/referral service. Such an action may take place in response to a merchant signing up for a delivery/referral service. Any number of merchants may have accounts opened with a delivery/referral service. Such accounts, as discussed above may be same or different for web and/or physical presences of a merchant. Opening an account may include receiving merchant information, authorizing/authenticating a payment method, receiving credit information about a merchant, checking the merchant credit to verify that the merchant is credit worth, determining a credit limit for a merchant, making database entries for the merchant so that deliveries for the merchant may be tracked, assigning a merchant a merchant ID, allowing tracking of delivery jobs that are from the merchant through a database or otherwise, and/or any other desired actions that may allow for a consolidated billing of delivery services to the merchant. Such actions may be performed by a computing device of a delivery/referral service such as a billing component of a computer system. Information may be received from and/or transmitted to a merchant through an API and/or other computer interface and/or non-computer method to facilitate account opening.

As indicated in FIG. 8, some embodiments may include receiving from the merchant an indication of an order for which a customer has requested delivery (e.g., same day delivery or other high speed delivery). Various examples of such a request are given herein, such as above with respect to the discussion of FIG. 7. A plurality of such indications of delivery jobs from the merchant to a plurality of respective customers may be received by a delivery/referral service (e.g., through an instaship API). Such orders may include orders for web customers and/or in store customers in any combinations.

As indicated in FIG. 8, some embodiments may include facilitating respective delivery of such a plurality of orders to respective customers. A respective delivery facilitation action may take place in response to receiving each order. Various examples of facilitating delivery are given herein. For example, such a delivering may include delivering from a brick and mortar merchant and/or a warehouse of virtual presence (e.g., an Amazon.com warehouse). For example, in some embodiments a determination of an independent and/or confederated delivery agent may be determined for each order with an associated cost. As another example, an on demand auction process may be used to determine a cost and a delivery agent to be used. Information may be transmitted to a delivery agent instructing the delivery agent to perform a delivery through a mobile device (e.g., an instaship app). One or more computing device of a delivery/referral service may perform actions to facilitate delivery (e.g., a routing/logic database, a dispatching portal, etc.).

As indicated in FIG. 8, some embodiments may include paying respective delivery agents for performing the respective deliveries of the orders to the respective customers. Such a payment action may take place in response to determining a delivery is completed and/or in response to reaching a payment period with a delivery agent. A delivery/referral service (e.g., a billing component thereof), may cause money to be transferred to an account of such delivery agents and/or arrange for payment to such agents in any other manner. An agent may be paid according to a deal setting costs such as a deal with a confederated delivery service that employees and agent, a deal reached through an auction method that led to a delivery agent being chosen, and/or any other deal that may set a rate for a delivery job. For each delivery job a respective delivery agent that performs the job may be paid some cost that may be the same or different from the cost recorded for a billing of a merchant for whom the deliveries are performed. The payment may be made in a consolidated manner (e.g., in response to a bill from a delivery agent, at the discretion of a delivery/referral service, for all deliveries for the merchant and/or a plurality of merchants that happen in a period using the delivery agent, etc.) and/or individually (e.g., in response to a job being completed). A database may track such payments that may be due to delivery agents to allow for such consolidated payment to delivery agents to be made for deliveries done for one or more merchants through the delivery/referral service over a time period. Payment may occur in response to a bill for the services being paid by a merchant and/or without reference to a bill being paid by a merchant. Different delivery agents may have different payment methods and/or schedules in various embodiments. As discussed elsewhere, multiple delivery agents may be paid for a delivery if multiple agents are used for that delivery in some embodiments. It should be recognized that examples of paying a delivery agent are given as non-limiting only and that a variety of manners for paying delivery agents may be used.

As indicated in FIG. 8, some embodiments may include recording a respective delivery cost for each of the plurality of orders. Such an action may take place in response to a determination of a delivery cost, in response to a completed devilry, in response to a delivery agent confirming a delivery and/or in response to any desired action. An actual cost that a delivery agent charges for the delivery may be recorded in some embodiments. In some embodiments a cost to a merchant may be recorded. The cost to the merchant may differ from and/or be the same as the cost of the delivery agent. Various examples of how such costs may be determined, may be the same, and/or may differ are given herein. For example, in some embodiments a cost estimate through an auction process and/or comparison to backup confederated delivery service costs may be recorded for each order delivered. As another example, a backup confederated service charge for each delivery may be recorded even if a lower auction price of an individual agent or otherwise is actually charged by a delivery agent to make the delivery. As still another example, a fee may be added to the costs (e.g., an x percent fee of actual charges, a y$ fee of backup confederated charges, and/or any other combination of fee types and cost types as desired). A database entry of such costs may be recorded in a manner that associates the costs with the merchant. Such information may be recorded by a billing module of a delivery/referral service in response to determining each respective cost of each delivery.

As indicated in FIG. 8, some embodiments may include determining a consolidated bill for a merchant for the respective deliveries of the plurality of orders to the respective customers. Such an action may take place in response to reaching a billing date (e.g., an end and/or near an end of a billing cycle). Such a bill may include a bill over a billing period (e.g., for all services that happen during a monthly billing period, for most of the delivery jobs that happen over a weekly billing period, and so on). Such a bill may include a cumulative bill that adds amounts from prior bills. Such a bill may include an occasional bill, a periodic bill, and/or any other form of bill. Such a bill may include a cost for deliveries that happened that meet a billing parameter (e.g., a cost of all deliveries over a billing period) by summing the costs recorded in a database that have those parameters (e.g., adding all costs incurred during a month for that merchant's deliveries).

Some embodiments may include transmitting that bill to a merchant and/or otherwise allowing a merchant to view such a bill. A merchant may be given the ability to pay such a bill and/or may automatically be charged for that bill through a payment method. For example, a merchant may make a payment on an invoice by entering a credit card information, checking account information, and/or other information through a billing interface. As another example, a merchant may pay in physical form with cash and/or check in person or through the mail.

Some embodiments may include allowing merchants to view feedback and/or historical information about the services provided during the period of time. Auditable information may be provided to a merchant that allows a merchant to view deliveries that occurred in a billing period (e.g., through a public website accessible by the merchant run by a computing device of a delivery/referral service and that may have access to a database in which delivery information is stored).

It should be recognized that while some examples are given in terms of a single merchant and many customers that various examples may provide respective billing for deliveries of goods from many merchants to customers of those respective merchants. It should be recognized that various examples are given about billing as non-limiting examples. For example, in some embodiments instead of and/or in connection with a period of billing, a credit limit may be used to determine bill timing. For example, a bill may be determined in response to a credit limit of merchant being reached and/or being neared (e.g., within 90% reaching 75%, etc.). In some embodiments, a credit limit being reached may cause delivery services to stop being offed to a merchant. For example, in some embodiments a bill for a month to month may accumulate until a threshold percentage of a credit limit is reached. At such a point a merchant may be notified to pay immediately or risk losing delivery services.

Example Point of Sale Interaction

Some embodiments may include an interaction between a point of sale/inventory system of one or more merchants and a referral/delivery service. In some embodiments, a delivery/referral service may receive item information about goods for sale by a merchant, goods in inventory at a merchant location, prices of goods sold by a merchant, any information about a good from a merchant. Such information may be used to populate a website (e.g., receive price and item information to make a menu of items the merchant sells), track and/or arrange delivery, manage risk and/or costs, and/or otherwise manage any desired aspect of a referral/delivery service.

In some embodiments, a point of sale system may interact with a delivery/referral service (e.g., through an API) to facilitate a delivery job. A point of sale system may transmit information about an order (e.g., source, items, destination, etc.) to a delivery/referral service. The point of sale system may receive information from the delivery/referral service back in response (e.g., availability, cost). The point of sale system may display some such information in response to receiving it and allow a choice to be made as to whether to accept or reject the delivery option(s) presented. If an acceptance is chosen of a delivery option through a delivery/referral service, then a cost for the delivery may be added to a charge to a customer through the point of sale system. In response to an acceptance and/or a completed sale, a delivery/referral service may be notified to make the delivery and/or transmitted any additional information about the order (e.g., specific items, etc.). Although an example of adding a cost to the bill is given, other embodiments may process the cost of delivery separately and/or a merchant may pay for delivery costs.

In some embodiments, a point of sale system and delivery/referral service may interact to facilitate routing of delivery jobs. For example, a point of sale system or systems may transmit inventory information to a delivery/referral service about multiple merchant locations. An order for goods may include an order for goods that are not all present at a single location and/or not all present at a location where a customer is making a purchase. In response, a delivery/referral service may use the inventory information to determine if another merchant location has the missing items and/or if there is a merchant location and/or a set of merchant locations that has all of the ordered items. Such a determination may include making a determination as to whether the merchant locations or location is in an area where high speed delivery to a destination can be made (e.g., within an hour commute of a customer destination, within 10 miles of customer destination, etc.). Such information may be used to source items for an order (e.g., for web customers) used to find an alternative source for an order that is different from a location where an order is being placed (e.g., for in store customers), and/or used to find an augmenting source and/or group of sources that can fulfill an order (e.g., for web customers and/or in store customers where a single merchant location does not have the inventory to fulfill the order). One or more delivery agents may be used to retrieve the items from the determined source or sources in response to determining that such source or sources should be used. Determination of such agents and/or cost and/or facilitation of delivery may proceed as described elsewhere herein.

In some embodiments, a point of sale system and/or a delivery/referral service may interact to allow use of merchant inventory to fulfill delivery orders from a variety of sources. For example in-store inventories may be used to fulfill delivery orders made from other stores and/or from a virtual presence (e.g., a website). One problem that e-commerce has created for brick and mortar stores is the use by customers of brick and mortar stores for show rooming goods that they actually purchase through the Internet. One solution that some embodiments enable is to allow physical stores to act as warehouse locations for virtual stores. This may allow for high speed (e.g., same day) delivery of items from a local location to a customer that would otherwise be located too far from a merchant to enable such a high speed delivery. Merchants with virtual presences may interact with merchants with physical presences through such a system even if the merchants may otherwise have no relationship with one another (e.g., Amazon may use a Target store's inventor to fulfill a delivery order to a customer near the Target store rather than shipping form an amazon warehouse farther away). FIG. 9 illustrates an example method that may be used in some embodiments to facilitate point of sale/inventory system interaction with a delivery/referral service. One or more actions of the illustrated method of FIG. 9 may be performed by one or more components (e.g., computer system modules) of a delivery/referral service (e.g., an instaship API, a database such as inventory database, a computing device, and/or any desired component desired). Various components may communicate with one another and or with outside devices (e.g., mobile devices of delivery agents, third party dispatching software, devices of merchants and so on).

As indicated in FIG. 9, some embodiments may include receiving information regarding inventories of a plurality of merchant from a plurality of point of sale systems (e.g. inventories available at a plurality of different merchant locations). The merchants may include a variety of merchant locations of a single merchant (e.g., multiple location of Best Buys) and/or locations of a variety of merchants (e.g., location of a Best Buy and a location of a local electronics store). The merchant locations may include brick and mortar store locations and/or warehouse locations of merchants (e.g., an amazon.com warehouse location). Such inventory may be reported in real time and/or occasionally (e.g., once a day, in response to an inventory change, etc.). Such information may be received by a delivery/referral service (e.g., through an API). In response to receiving such information, a delivery/referral service may store inventory information to maintain a running inventory across the plurality of merchant locations (e.g., in an inventory database). Such information may allow the delivery/referral service to improve routing/delivery of orders by enabling a plurality of sourcing options.

As indicated in FIG. 9, some embodiments may include receiving an indication of a delivery order that a customer places with a merchant of the plurality of merchants (e.g., at one merchant location out of a plurality of merchant locations that have their inventory tracked by a delivery/referral service). The delivery order may indicate a plurality of items ordered by the customer. The order may be an order placed by a web customer of a merchant of the plurality of merchants and/or an order placed by an in store customer of a merchant of the plurality of merchants. The order may include an order for a plurality of goods. The goods may be in inventory and/or sold from one or more of the merchant locations. For example, a web customer of bestbuy.com may make a purchase of a plurality of items sold through bestbuy.com, which may or may not be in stock at a particular Best Buy location and/or a bestbuy.com warehouse. As another example, an in-store customer of Target may purchase a plurality of items sold by a Target location even if some of those items are not in stock at that the Target location at which the user makes the purchase. Various examples of receiving orders are given herein.

As yet another example, a customer may be a customer of an aggregator that is not one of the plurality of merchants but rather may be, for example, a public website that shows information about items offered by the plurality of merchants (e.g., run by the delivery/referral service). A public website may have a menu of items available and/or prices for those items populated based on inventory information received from the merchant locations. A user may select any number of items from the plurality of inventories that may span merchant locations for a single or multiple merchants through such a site. A webserver of a referral/delivery service may generate such a web page ay referring inventory, communicating with customers, facilitating delivery, and/or taking any other desired actions.

As indicated in FIG. 9, some embodiments may include determining one or more sources of items for a high speed delivery of the delivery order to the customer based on the reported inventories of the plurality of merchants. Such one or more sources may include a source that is different from a location where an in store customer places an order for delivery. Such one or more locations may include an in-store or warehouse location of a competitor of a merchant that receives the order through a virtual presence (e.g., a target-.com warehouse used to fulfill an order received through amazon.com). Any number of sources may be used in any combination that allows for the order to be fulfilled in high speed fashion.

A preference may be given to a source where a user places the order in some embodiments. A preference may be given to a single company even if multiple locations of that company are used instead of using a single location of a different company (e.g., nearby Best Buys inventories may be used before third party electronics store inventory is used). Warehouse locations for virtual orders may be given preference over brick and mortar locations for virtual orders. A preference may be given to a lowest cost location. A preference may be given to inventory locations that have a highest inventory of one or more of the items of an order. A preference may be given to a set of sources that minimizes a distance traveled to fulfill the order. A preference may be given to sources that are nearest to a customer delivery destination. It should be recognized that any of any of a variety of business logic in any combination may be used to determine a sourcing for an order that may be the same or differ from an order source.

As indicated in FIG. 9, some embodiments may include, determining one or more delivery agents for making the high speed delivery from the one or more sources to a customer. Various examples of determining one or more delivery agents are given herein (e.g., auction, confederated deals, etc.). In some embodiments, such a delivery agent determination may be made in response to a determination of one or more item sources. In other embodiments, such a determination of one or more item sources may be made in response to a determination of one or more delivery agents. In still other embodiments a determination of a source and/or determination of a delivery agent may be made in response to something else (e.g., receiving an indication of a delivery job, receiving a confirmation that a customer selected a delivery job, and so on). It should be recognized that while examples are given in terms of delivering to a customer that any destination may be used (e.g., an office, a friend, a school, a family member, etc.). Such a destination may be set through an interface that allows entry of delivery details (e.g., a shipping interface of a website and/or point of sale system).

As indicated in FIG. 9, some embodiments may include determining a cost for the high speed delivery of the delivery order. Such a determination may be made in response to determining the delivery agent and/or sources. Various examples of determining costs are given herein. For example, in some embodiments, a cost for the delivery agents may be determined based on auction and/or deals with confederated delivery services.

In some embodiments a cost of an item may differ from the order source to the actual determined source for item. That difference may factor into the cost of the delivery. For example, if a cost of an item at a determined source is greater than the cost at the ordering source then the additional cost may be added to the delivery cost. In some embodiments that cost may not be added and/or may be absorbed by a merchant (e.g., an item source and/or an order source in any combination or arrangement). In other embodiments, a cost may be lower. That lower cost may be subtracted from the cost of delivery. In other embodiments that lower cost may not affect the cost of delivery but rather the difference may be paid the item source and/or kept by a merchant and/or referral/delivery service. In some embodiments, a tax may be different at an item source compared to a source of an order (e.g., brick and mortar compared to online order). Similarly, the difference in tax may be treated as part of a cost and may or may not be added or subtracted to a cost.

In some embodiments, differences in prices and/or costs of items may be tracked by a delivery/referral service based on inventory reports. A delivery/referral service may pay source merchants for goods including increased pricing and may add such fees to a consolidated or other bill to a merchant that is the source of an order from a customer. In some embodiments, an order source may pay an item source (e.g., directly, through the delivery/referral service, with a credit card, etc.).

As indicated in FIG. 9, some embodiments may include transmitting information identifying the cost. Such a transmission may be made in response to determining the one or more sources and the cost for the high speed delivery of the delivery order. Such information may be transmitted, for example, through an instaship API to a point of sale system and/or to a customer through a website. Such information may be presented to a customer through an interface and/or in any manner. This may allow a customer to determine whether to spend the money on a high speed delivery and/or take some other option for obtaining ordered items.

As indicated in FIG. 9, some embodiments may include receiving an indication that the customer desired the high speed delivery of the delivery order. Examples of such an indication are given herein. For example, a user may make a selection through a webpage that is forwarded, possibly along with other enabling information for the delivery, to the delivery/referral service. As another example, a customer may make a selection through a point of sale system in an in store location that is transmitted to a delivery/referral service.

As indicated in FIG. 9, some embodiments may include communicating to a point of sale system of at least one of the one or more sources that at least one item is unavailable (e.g., locked, purchased, etc.). In some embodiments, such a communicating may be done in response to receiving an indication that the customer desires high speed delivery. Such a point of sale system may be one of a plurality of point of sale systems from which a delivery/referral service received inventory information. For example, a delivery/referral service may write to a point of sale system that items that are determined to be sourced from a merchant location are purchase (e.g., inventory may be decreased, agent at merchant location may be notified to pick and pack the order for pickup, money may be transferred to pay for the items, and/or any other interaction through the point of sale system may be made to complete the sale through the determined item source). In some embodiments, one or more item sales may be prevented in some instances by a point of sale terminal so that an inventory does not reach a level that is lower than needed to fulfill the order before the order is fulfilled from the item source. Other embodiments may include any manner of communicating information to an item source (e.g., fax, email, phone call, etc.).

As indicated in FIG. 9, some embodiments may include facilitating high speed delivery of the items from the one or more sources using the one or more delivery agents. In some embodiments, such facilitating may be done in response to receiving an indication that high speed delivery is desired. Such a facilitation may be done in response to determining the one of more delivery agents. Various examples of facilitating delivery using one or more delivery agents is given herein. For example, some embodiments may include communicating details of the delivery job to a delivery agent through a mobile application. Some embodiments may include arranging picking and/or packing service agents and/or may use an item source or delivery agent for such picking and/or packing services.

Some embodiments may include billing merchants for delivery services provided through a delivery/referral service. Some examples of such billing are given elsewhere herein. Some embodiments may include paying delivery agents for delivery services provided. Some examples of paying of delivery agents is given herein.

In some embodiments, if an order delivery fails an error procedure may be followed. For example an order may be canceled, an order without one or more missing items may be delivered, a refund may be processed, and/or any other action may be taken. As another example, in some embodiments, if an order fails because a merchant that was set as a source for an item based on reported inventory does not in fact have that inventory upon pickup, the source merchant may be required to pay for costs of delivering a replacement item for that item. A delivery/referral service may be notified of the defect in a pickup and determine where a replacement source may be found and arrange for that replacement source be used for the delivery. The replacement source may be given a preference if it can be used for a highs speed delivery in some embodiments. In some embodiments a replacement source may not be able to provide high speed delivery (e.g., there may be no merchant locations that have the item that and from which a delivery agent can deliver the item to the destination in time to meet the high speed deadline). In some embodiments a customer may be refunded some or all of an order and/or delivery charge in response to an order failure. To help alleviate some possible order failures, an inventory scrape from a point of sale system may be triggered to obtain a most up to date inventory because a merchant is assigned as a source of an item. In some embodiments a confirmation may be requested from a merchant before they are assigned as a source for an item. Any desired precautions may be taken to help ensure inventory is present for a pickup.

It should be recognized that while examples are given in terms of a single order that other embodiments may include any number of orders for any number of customers from any number of merchants. An inventory tracking of merchant locations may be adjusted when an item source is assigned for that order (e.g., in response to a customer choose and/or paying for high speed delivery). Such adjustment may then be used for determining later orders even if the order has not yet finished being delivered. Such adjustment may help alleviate an overselling of goods in inventory. It should be recognized that point of sale systems may take any form. Inventory system may be used as part of and/or in place of a point of sale system. In some embodiments, a point of sale and inventory system are a same thing and/or integrated together. In some embodiments, point of sale and inventory systems are different things and may act together and/or may not both be present. It should be recognized that the exact details of a point of sale and/or inventory system is not limited in any embodiment.

Such a method may allow a merchant to use other merchant's inventories to fulfill high speed delivery orders. This can spread the availability of high speed delivery from the areas around warehouse and/or store locations of a single company to a much larger area even when the company does not operate in all of that area. Such a method may also minimize the costs of enabling high speed delivery by reducing the need to maintain inventories for delivery on hand or held by all merchants in all locations. Rather, sharing inventories allows fewer or even a single merchant location to serve as a warehouse location for a plurality of merchants. Such a method also increases revenue to brick and mortar locations by allowing them to benefit from their proximity to customers when those customer place high speed delivery orders away from the store locations.

It should be recognized that the various examples of point of sale system interacting with a delivery/referral service are given as non-limiting examples only. Various examples may be combined together in any combination. Various embodiments may include different actions, additional actions, fewer actions, differently ordered actions, no action discussed, and so on. For example, in some embodiments one or more merchants may have its own proprietary delivery agent that may be used to deliver part of and/or all of an order that is sourced from that merchant.

Some example embodiments may refer to a delivery service, a referral service, a delivery/referral service and/or components thereof. It should be recognized that these examples service types are given as examples only and may be interchangeable in various embodiments. A delivery/referral service may include any service that provides delivery services, any service that provides referral services for merchants and/or delivery agents, any service that provides delivery and referral service, and so on in any combination.

Processes and/or Apparatus

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget but does not include anything else.

The term "compose" and variations thereof means "to make up the constituent parts of, component of, or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car, and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number, and the data also represents something else".

The term "whereby" is used herein only to precede a clause or other set of words that express only the intended result, objective, or consequence of something that is previously and explicitly recited. Thus, when the term "whereby" is used in a claim, the clause, or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed and does not imply that numerical methods must be used and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits, and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued, and canceled claims). In addition, an embodiment may be (but need not necessarily be) covered by several claims. Accordingly, where a claim (regardless of whether pending, amended, issued, or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application.

Applicants intend to file additional applications to pursue patents for subject matter that has been disclosed and enabled but not claimed in the present application.

VII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

VIII. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

Further Embodiments

It should be recognized that when a delivery agent is referenced herein that such a reference is given as a non-limiting example only. Some embodiments may include a delivery service provider with any number of employees. Some embodiments may include a delivery service provider that acts as an agent. Some embodiments may include a delivery service provider that acts as a principle. Any service provider may utilize such an auction system, or any selection system described herein or elsewhere.

It should be recognized that although various examples are given in which a delivery agent places one bid, that some embodiments may include any desired auction system. For example, a traditional auction may be used, a reverse auction may be used, a silent auction may be used, a secret auction may be used, an open auction may be used, and so on. In some embodiments, an auction may have a reserve price and/or time. In some embodiments, an auction may have a limited period of time. In some embodiments, a delivery agent may submit changes to a bid and/or updated bids. In some embodiments a delivery agent may be able to see information about competing bids. In some embodiments, information about other delivery agent bids may be provided to a delivery agent. In some embodiments more than one bid may be received from a delivery agent.

In some embodiments, for example, a delivery agent may receive an indication of a bid by another delivery agent. In response to receiving such an indication, the delivery agent may determine a bid to be placed. Such a bid may be a second bid by the delivery agent. Such a bid may be for a lower price than a first bid by the delivery agent. Such a bid may be for a better time than the first bid. Such a bid may be for a lower price and/or better time than the bid by the other delivery agent. Such a bid may be based on cost of providing the service. In response to determining such a bid, an indication may be transmitted.

It should be recognized that while FIG. 3 illustrates one non-limiting example method, other embodiments may include any method desired which may include same or different actions in any desired order and/or number. For example, various portions of FIG. 3 may be utilized with respect to any selection process discussed herein or elsewhere (e.g., filtering for pre-ordered delivery auctions, etc.). It should be recognized that action of such a process may be performed by any entity as desired in various embodiments.

It should be recognized that although various examples are given with multiple entities acting as intermediaries, that some embodiments may include no such intermediaries, more such intermediaries, ad/or different such intermediary. For example, some embodiments may include a distributed system. Some embodiments may include a system where a user, a payment processing service, and/or a system a system 101, and/or payment processing device perform any role that may have been performed by one of the others. For example, a user may directly communicate with a payment processing device, may perform payment processing, and so on. Such actions and/or other actions may be performed by any entity in any combination.

Various examples may refer to a system such as system 101. It should be recognized that such references are given as examples only and that system 101 and FIG. 1 are both given as examples only. Various embodiments may include any system(s) in any configuration and/or no system that may or may not include any characteristics similar to system 101 and any reference to system 101 may refer to any other system with or without such characteristics.

It should be recognized that although various embodiments are given in terms of a good being delivered and/or otherwise provided, that some embodiments may relate to providing a service rather than a good. For example, selection of a service provider of any sort may be made in some embodiments, selection of goods to be used by a service provider may be made in some embodiments, selection of sub-contractor(s) to a service provider may be made in some embodiments, providing any such selected item may be made in some embodiments, and so on.

Some embodiments may have been described in terms of a single delivery agent and/or other service provider performing a delivery or other service from a single and/or multiple merchants to a single and/or multiple customers. In some embodiments, multiple delivery agents and/or other service providers may be used to make a single and/or multiple deliveries and/or perform any desired service involving a single and/or multiple sources, and/or a single and/or multiple customers and/or destinations. Some embodiments may include facilitating using multiple service providers to provide a service as desired.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

The invention claimed is:

1. An apparatus comprising:
a first computing device configured to control:
receiving, over a communication network, from a first merchant an indication of a first plurality of orders for which respective first customers have requested delivery, in which the first plurality of orders originates from one or more additional computing devices separate from the first computing device, and in which the first merchant has a first account with a delivery/referral service;
in response to receiving a first order of the first plurality of orders,
determining an unavailability result, by determining whether at least one first item of the first order is unavailable for delivery based on a condition on delivery of the at least one first item using location information received in substantially real time, via the communication network, from substantially real time tracking of location of a mobile device of at least one mobile delivery agent, and
displaying, via transmission over the communication network, on a graphical user interface of a point of sale system of the first merchant, an indication whether the at least one first item is determined to be unavailable for delivery based on the unavailability result;
transmitting, to the one or more additional computing devices, delivery zone information to cause the one or more additional computing devices to display a delivery zone for each of the first plurality of orders;
receiving, over the communication network, from a second merchant an indication of a second plurality of orders for which respective second customers have requested delivery, in which the second plurality of orders originate from one or more second additional computing devices separate from the first computing device, and in which the second merchant has a second account with the delivery/referral service;
in response to receiving a second order of the second plurality of orders, communicating, over the communication network, to a point of sale system of the second merchant that at least one second item of the second order is unavailable based on the second order;
facilitating delivery of the first plurality of orders to the respective first customers and the second plurality of orders to the respective second customers, by respective delivery agents;
determining a first consolidated bill for the first merchant for the respective deliveries of the first plurality of orders to the respective first customers based on respective delivery costs of the first plurality of orders; and
determining a second consolidated bill for the second merchant for the respective deliveries of the second plurality of orders to the respective second customers based on respective delivery costs of the second plurality of orders.

2. The apparatus of claim 1, in which each respective delivery cost is determined based on an auction process among a respective set of delivery agents.

3. The apparatus of claim 1, in which the first computing device is configured to control receiving, over the communication network, information regarding inventories of the first merchant from the point of sale system of the first merchant.

4. The apparatus of claim 3, in which the first computing device is configured to control displaying an ordering interface on the graphical user interface based on the inventories of the first merchant.

5. The apparatus of claim 1, in which the first computing device is configured to control:
receiving, over the communication network, information regarding inventories of a plurality of merchants from a plurality of point of sale systems, in which the plurality of merchants includes the first merchant and the second merchant.

6. The apparatus of claim 5, in which the first computing device is configured to control:
in response to receiving a third order of the first plurality of orders, determining a plurality of sources of items for a high speed delivery of the third order to a respective first customer based on the inventories of the plurality of merchants;
determining one or more delivery agents for making the high speed delivery from the plurality of sources to the respective first customer;
determining a cost for the high speed delivery of the third order; and
in response to determining the plurality of sources and the cost for the high speed delivery of the third order, transmitting information identifying the cost for the high speed delivery of the third order.

7. The apparatus of claim 6, in which the first computing device is configured to control:
receiving, over the communication network, an indication that the respective first customer desires the high speed delivery of the third order;
in response to receiving the indication that the respective first customer desires the high speed delivery, communicating, over the communication network, to a point of sale system of at least one of the plurality of sources that at least one third item is unavailable; and
in response to receiving the indication that the respective first customer desires the high speed delivery, facilitating the high speed delivery of the items from the plurality of sources using the one or more delivery agents.

8. The apparatus of claim 7, in which the first computing device is configured to control:
paying the one or more delivery agents for performing the high speed delivery; and
providing a consolidated bill to each of the plurality of sources for the high speed delivery and other high speed deliveries.

9. The apparatus of claim 6, in which high speed delivery includes same day delivery.

10. The apparatus of claim 6, in which determining the cost includes initiating an auction process among a set of delivery agents.

11. A method comprising:
controlling, by at least one processor:
receiving, over a communication network, from a first merchant an indication of a first plurality of orders for which respective first customers have requested delivery, in which the first plurality of orders originate from one or more additional computing devices that do not include the at least one processor and in which the first merchant has a first account with a delivery/referral service;
in response to receiving a first order of the first plurality of orders,
determining an unavailability result, by determining whether at least one first item of the first order is unavailable for delivery based on a condition on delivery of the at least one first item using location information received in substantially real time, via the communication network, from substantially real time tracking of location of a mobile device of at least one mobile delivery agent, and
displaying, via transmission over the communication network, on a graphical user interface of a point of sale system of the first merchant, an indication whether the at least one first item is determined to be unavailable for delivery based on the unavailability result;
transmitting, to the one or more additional computing devices, delivery zone information to cause the one or more additional computing devices to display a delivery zone for each of the first plurality of orders;
receiving, over the communication network, from a second merchant an indication of a second plurality of orders for which respective second customers have requested delivery, in which the second plurality of orders originate from one or more second computing devices that do not include the at least one processor, and in which the second merchant has a second account with the delivery/referral service;
in response to receiving a second order of the second plurality of orders, communicating to a point of sale system of the second merchant that at least one second item of the second order is unavailable based on the second order;
facilitating delivery of the first plurality of orders to the respective first customers and the second plurality of orders to the respective second customers, by respective delivery agents;
determining a first consolidated bill for the first merchant for the respective deliveries of the first plurality of orders to the respective first customers based on respective delivery costs of the first plurality of orders; and
determining a second consolidated bill for the second merchant for the respective deliveries of the second plurality of orders to the respective second customers based on respective delivery costs of the second plurality of orders.

12. The method of claim 11, in which each respective delivery cost is determined based on an auction process among a respective set of delivery agents.

13. The method of claim 11, further comprising:
controlling, by the at least one processor, receiving, over the communication network, information regarding inventories of the first merchant from the point of sale system of the first merchant.

14. The method of claim 13, further comprising:
controlling, by the at least one processor, displaying an ordering interface on the graphical user interface based on the inventories of the first merchant.

15. The method of claim 11, further comprising:
controlling, by the at least one processor, receiving, over the communication network, information regarding inventories of a plurality of merchants from a plurality of point of sale systems, in which the plurality of merchants includes the first merchant and the second merchant.

16. The method of claim 15, further comprising:
controlling, by the at least one processor:

in response to receiving a third order of the first plurality of orders, determining a plurality of sources of items for a high speed delivery of the third order to a respective first customer based on the inventories of the plurality of merchants;

determining one or more delivery agents for making the high speed delivery from the plurality of sources to the respective first customer;

determining a cost for the high speed delivery of the third order; and in response to determining the plurality of sources and the cost for the high speed delivery of the third order, transmitting information identifying the cost for the high speed delivery of the third order.

17. The method of claim 16, further comprising:

controlling, by the at least one processor:

receiving, over the communication network, an indication that the respective first customer desires the high speed delivery of the third order;

in response to receiving the indication that the respective first customer desires the high speed delivery, communicating, over the communication network, to a point of sale system of at least one of the plurality of sources that at least one third item is unavailable; and in response to receiving the indication that the respective first customer desires the high speed delivery, facilitating the high speed delivery of the items from the plurality of sources using the one or more delivery agents.

18. The method of claim 17, further comprising:

controlling, by the at least one processor:

paying the one or more delivery agents for performing the high speed delivery; and providing a consolidated bill to each of the plurality of sources for the high speed delivery and other high speed deliveries.

19. The method of claim 16, in which high speed delivery includes same day delivery.

20. The method of claim 16, in which determining the cost includes initiating an auction process among a set of delivery agents.

* * * * *